(12) United States Patent
Hwang et al.

(10) Patent No.: US 9,357,537 B2
(45) Date of Patent: May 31, 2016

(54) METHOD AND APPARATUS FOR TRANSMITTING UPLINK DATA

(71) Applicant: LG ELECTRONICS INC., Seoul (KR)

(72) Inventors: Daesung Hwang, Anyang-si (KR); Dongyoun Seo, Anyang-si (KR); Yunjung Yi, Anyang-si (KR); Joonkui Ahn, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/406,712

(22) PCT Filed: Jun. 19, 2013

(86) PCT No.: PCT/KR2013/005384
§ 371 (c)(1),
(2) Date: Dec. 9, 2014

(87) PCT Pub. No.: WO2013/191453
PCT Pub. Date: Dec. 27, 2013

(65) Prior Publication Data
US 2015/0156762 A1    Jun. 4, 2015

Related U.S. Application Data

(60) Provisional application No. 61/661,801, filed on Jun. 19, 2012.

(51) Int. Cl.
| | |
|---|---|
| *H04W 4/00* | (2009.01) |
| *H04W 72/04* | (2009.01) |
| *H04L 1/16* | (2006.01) |
| *H04L 1/18* | (2006.01) |
| *H04L 5/00* | (2006.01) |
| *H04W 52/02* | (2009.01) |

(52) U.S. Cl.
CPC ......... *H04W 72/0413* (2013.01); *H04L 1/1671* (2013.01); *H04L 1/1812* (2013.01); *H04L 5/0048* (2013.01); *H04L 5/0055* (2013.01); *H04W 52/0212* (2013.01)

(58) Field of Classification Search
None
See application file for complete search history.

(56) References Cited

U.S. PATENT DOCUMENTS

| | | | |
|---|---|---|---|
| 8,498,198 B2 * | 7/2013 | Kim | H04J 11/0069 370/210 |
| 2010/0098012 A1 | 4/2010 | Bala et al. | |
| 2010/0103902 A1* | 4/2010 | Kim | H04L 5/0048 370/330 |
| 2012/0082157 A1 | 4/2012 | Yamada et al. | |
| 2012/0127869 A1* | 5/2012 | Yin | H04L 1/0031 370/252 |
| 2012/0213187 A1 | 8/2012 | Yang et al. | |
| 2013/0188587 A1 | 7/2013 | Kwak et al. | |

(Continued)

FOREIGN PATENT DOCUMENTS

| | | |
|---|---|---|
| KR | 10-0943154 B1 | 2/2010 |
| KR | 10-2011-0046288 A | 5/2011 |
| KR | 10-2012-0018040 A | 2/2012 |

*Primary Examiner* — Anh-Vu Ly
(74) *Attorney, Agent, or Firm* — Birch, Stewart, Kolasch & Birch, LLP

(57) ABSTRACT

Provided are a method and apparatus for transmitting uplink data. The method for transmitting data in a uplink subframe comprises the steps of: determining whether or not a hybrid automatic retransmission request-acknowledgement (HARQ-ACK) and uplink control information (UCI) are being simultaneously transmitted in the uplink subframe; selecting either the HARQ-ACK or UCI on the basis of the HARQ-ACK state for HARQ-ACK upon the occurrence of simultaneous transmission; and transmitting the selected HARQ-ACK or UCI in the uplink subframe.

16 Claims, 14 Drawing Sheets

(56) References Cited

U.S. PATENT DOCUMENTS

2014/0177572 A1* 6/2014 Papasakellariou .. H04W 36/385 370/329

2014/0286296 A1* 9/2014 Tiirola ................... H04L 5/001 370/329

2015/0245336 A1* 8/2015 Noh ...................... H04W 72/12 370/329

* cited by examiner

FIG. 9

Cell specific SRS subframe (period T=2)

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |

UE specific SRS subframe (period T=10)

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |

METHOD AND APPARATUS FOR TRANSMITTING UPLINK DATA

CROSS REFERENCE TO RELATED APPLICATIONS

This application is the National Phase of PCT International Application No. PCT/KR2013/005384, filed on Jun. 19, 2013, which claims priority under 35 U.S.C. 119(e) to U.S. Provisional Application No. 61/661,801, filed on Jun. 19, 2012, all of which are hereby expressly incorporated by reference into the present application.

BACKGROUND OF THE INVENTION

1. Field of the Invention

The present invention relates to wireless communications and, more particularly, to a method and apparatus for transmitting uplink data.

2. Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, such as a physical downlink shared channel (PDSCH) and a physical downlink control channel (PDCCH), and an uplink channel, such as a physical uplink shared channel (PUSCH) and a physical uplink control channel (PUCCH).

The PUCCH is an uplink control channel used for transmission of uplink control information such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

SUMMARY OF THE INVENTION

The present invention provides a method for transmitting uplink data.

The present invention also provides an apparatus for transmitting uplink data.

In an aspect of the present invention, a method for transmitting data in uplink subframe includes determining whether hybrid automatic retransmission request-acknowledgement (HARQ-ACK) and uplink control information (UCI) are simultaneously transmitted in the uplink subframe, selecting one of the HARQ-ACK and the UCI depending on HARQ-ACK state for the HARQ-ACK, if the simultaneous transmission occurs, and transmitting the selected one of the HARQ-ACK and the UCI in the uplink subframe, wherein the UCI includes at least one of periodic reporting channel state information (CSI) and sounding reference signal (SRS), wherein the HARQ-ACK state is one of ACK, non-acknowledgement (NACK), and discontinuous transmission (DTX), and wherein the UCI is selected and transmitted in the uplink subframe if the HARQ-ACK state is the DTX or the NACK.

In another aspect of the present invention, a user equipment that transmits data in a wireless communication system includes a processor, wherein the processor is configured to perform, determining whether hybrid automatic retransmission request-acknowledgement (HARQ-ACK) and uplink control information (UCI) are simultaneously transmitted in the uplink subframe, selecting one of the HARQ-ACK and the UCI depending on HARQ-ACK state for the HARQ-ACK if the simultaneous transmission occurs, and transmitting the selected one of the HARQ-ACK and the UCI in the uplink subframe, wherein the UCI includes at least one of periodic reporting channel state information (CSI) and sounding reference signal (SRS), wherein the HARQ-ACK state is one of ACK, non-acknowledgement (NACK), and discontinuous transmission (DTX), and wherein the UCI is selected and transmitted in the uplink subframe if the HARQ-ACK state is the DTX or the NACK.

Advantageous Effects

The transmission efficiency of uplink data can be increased.

BRIEF DESCRIPTION OF THE DRAWINGS

FIG. 9 shows an example of a periodic SRS transmission.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved Node-B (eNB), a base transceiver system (BTS), an access point, etc.

Figure 1:
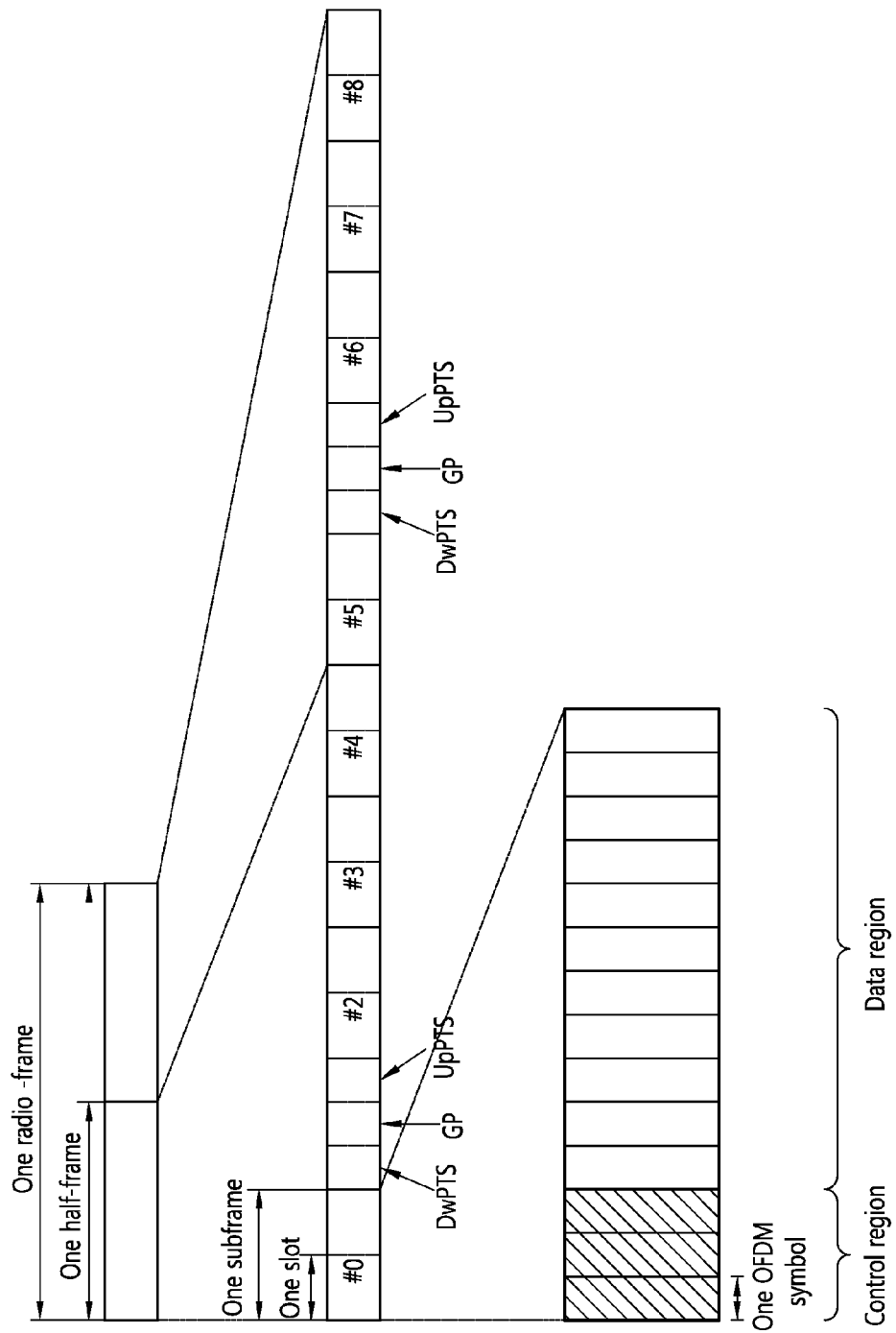
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference, and it is related to a time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and downlink.

In TDD, a downlink (DL) subframe and an uplink (UL) subframe co-exist in one radio frame. Table 1 shows an example of a configuration of the radio frame.

TABLE 1

| UL-DL Config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a first slot in the subframe. However, the number of OFDM symbols included in the control region may vary. A physical downlink control channel (PDCCH) and another control channel are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a second slot of a first subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

The control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for the PDCCH detection. The blind decoding is a scheme in which a desired identifier is de-masked from a CRC of a received PDCCH (referred to as a candidate PDCCH) to determine whether the PDCCH is its own control channel by performing cyclic redundancy check (CRC) error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
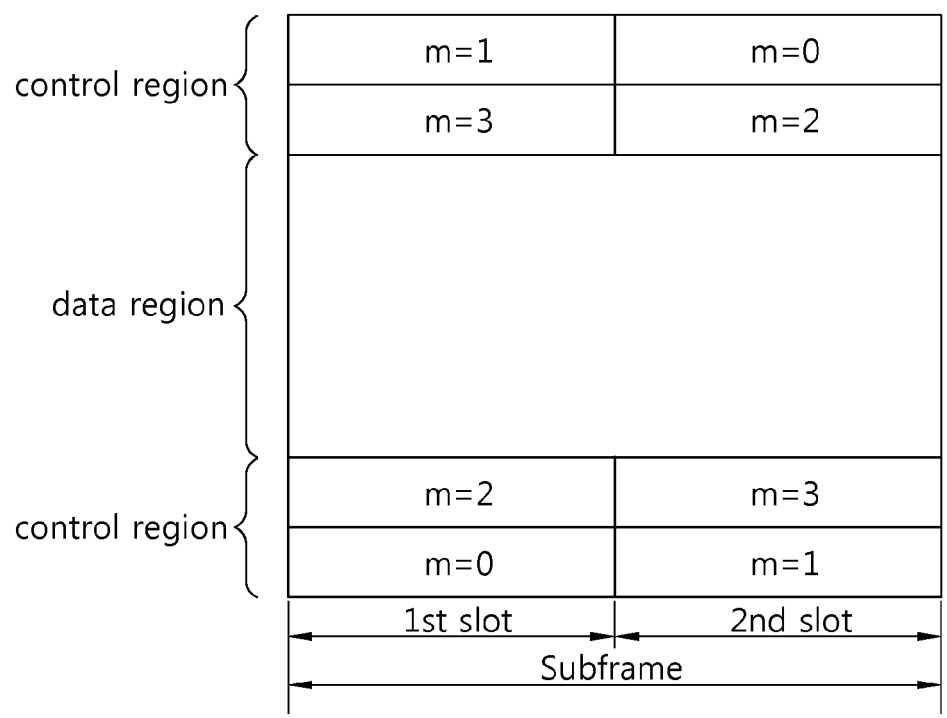
FIG. 2 shows an example of an uplink subframe in 3GPP LTE.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. The RBs belonging to the RB pair occupy different subcarriers in each of a first slot and a second slot. m is a location index indicating a logical frequency-domain location of the RB pair allocated to the PUCCH in the subframe. It shows that the RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH Format | Modulation scheme | Number of bits for subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

A length of a sequence is equal to the number of elements included in the sequence. A cell index for indicating the sequence can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in the PUCCH format 1b will be described.

Figure 3:
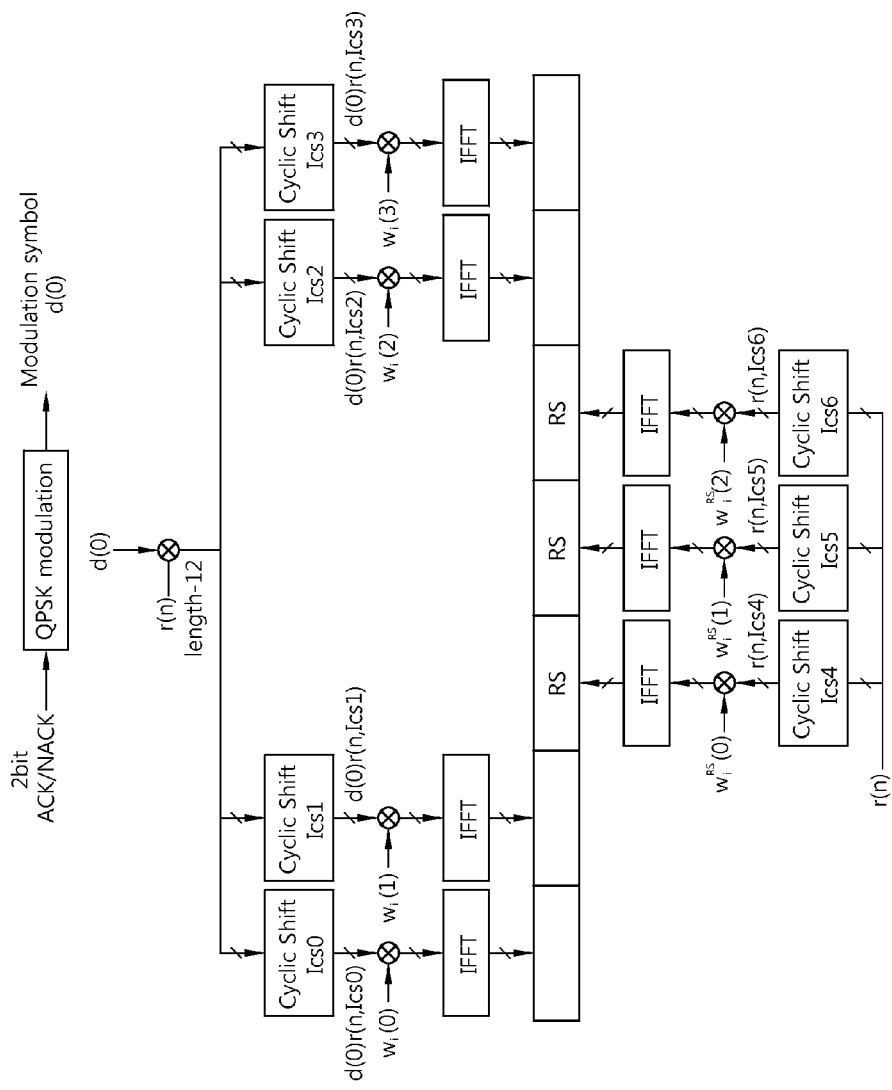
FIG. 3 shows a physical uplink control channel (PUCCH) format 1b in a normal cyclic prefix (CP) in 3GPP LTE.

FIG. 3 shows a PUCCH format 1b in a normal CP in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$, may vary depending on a slot number $n_s$ in a radio frame and/or a symbol index l in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$ and $I_{cs3}$.

The modulation symbol d(0) is spread to a cyclically shifted sequence $r(n, I_{cs})$. When a one-dimensionally spread sequence mapped to an $(i+1)^{th}$ OFDM symbol in a subframe is denoted by m(i), it can be expressed as follows:

$$\{m(0),m(1),m(2),m(3)\}=\{d(0)r(n,I_{cs0}),d(0)r(n,I_{cs1}),d(0)r(n,I_{cs2}),d(0)r(n,I_{cs3})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spreading factor K=4 uses the following sequence.

TABLE 3

| Index (i) | [ $w_i(0)$, $w_i(1)$, $w_i(2)$, $w_i(3)$ ] |
|---|---|
| 0 | [ +1, +1, +1, +1 ] |
| 1 | [ +1, −1, +1, −1 ] |
| 2 | [ +1, −1, −1, +1 ] |

An orthogonal sequence $w_i(k)$ (where i is a sequence index, $0 \leq k \leq K-1$) having a spreading factor K=3 uses the following sequence.

TABLE 4

| Index (i) | [ $w_i(0)$, $w_i(1)$, $w_i(2)$ ] |
|---|---|
| 0 | [ +1, +1, +1 ] |
| 1 | [ +1, $e^{j2\pi/3}$, $e^{j4\pi/3}$ ] |
| 2 | [ +1, $e^{j4\pi/3}$, $e^{j2\pi/3}$ ] |

A different spreading factor can be used for each slot.

Therefore, when any orthogonal sequence index i is given, a two-dimensionally spread sequences {s(0), s(1), s(2), s(3)} can be expressed as follows:

$$\{s(0),s(1),s(2),s(3)\}=\{w_i(0)m(0),w_i(1)m(1),w_i(2)m(2),w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences r(n, $I_{cs4}$), r(n, $I_{cs5}$), and r(n, $I_{cs6}$) can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}_{PUCCH}$ is defined in order for the UE to obtain the three parameters for configuring the PUCCH. The resource index $n^{(1)}_{PUCCH}$ is defined to $n_{CCE}+N^{(1)}_{PUCCH}$, where $n_{CCE}$ is an index of a first CCE used for transmission of corresponding DCI (i.e., DL resource allocation used to receive DL data mapped to an ACK/NACK signal), and $N^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
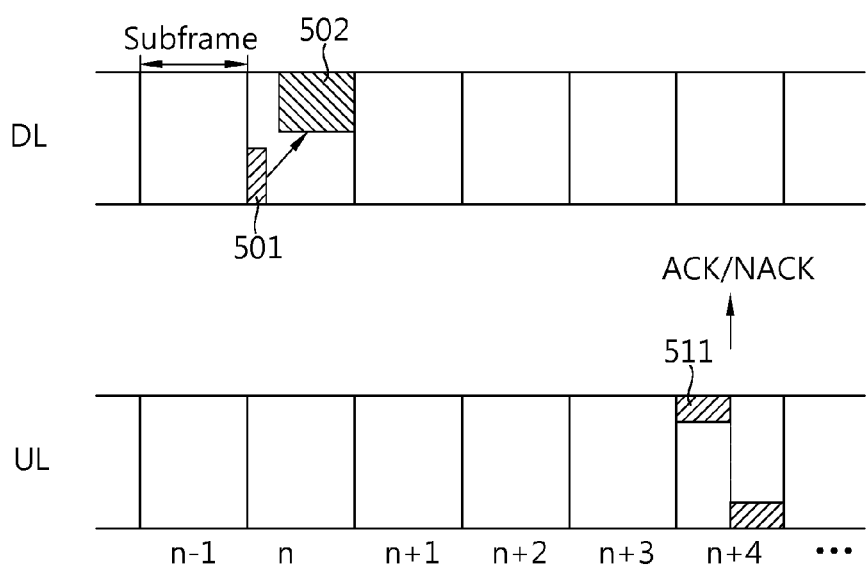
FIG. 4 shows an example of performing hybrid automatic repeat request (HARQ).

FIG. 4 shows an example of performing HARQ.

By monitoring a PDCCH, a UE receives a DL grant including a DL resource allocation on a PDCCH 501 in an $n^{th}$ DL subframe. The UE receives a DL transport block through a PDSCH 502 indicated by the DL resource allocation.

The UE transmits an ACK/NACK response for the DL transport block on a PUCCH 511 in an $(n+4)^{th}$ UL subframe. The ACK/NACK response can be regarded as a reception acknowledgement for a DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUCCH}=n_{CCE}+N^{(1)}_{PUCCH}$.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC may be mapped to one cell. Therefore, when a UE communicates with a BS through a plurality of DL CCs, it can be said that the UE receives a service from a plurality of serving cells.

Figure 5:
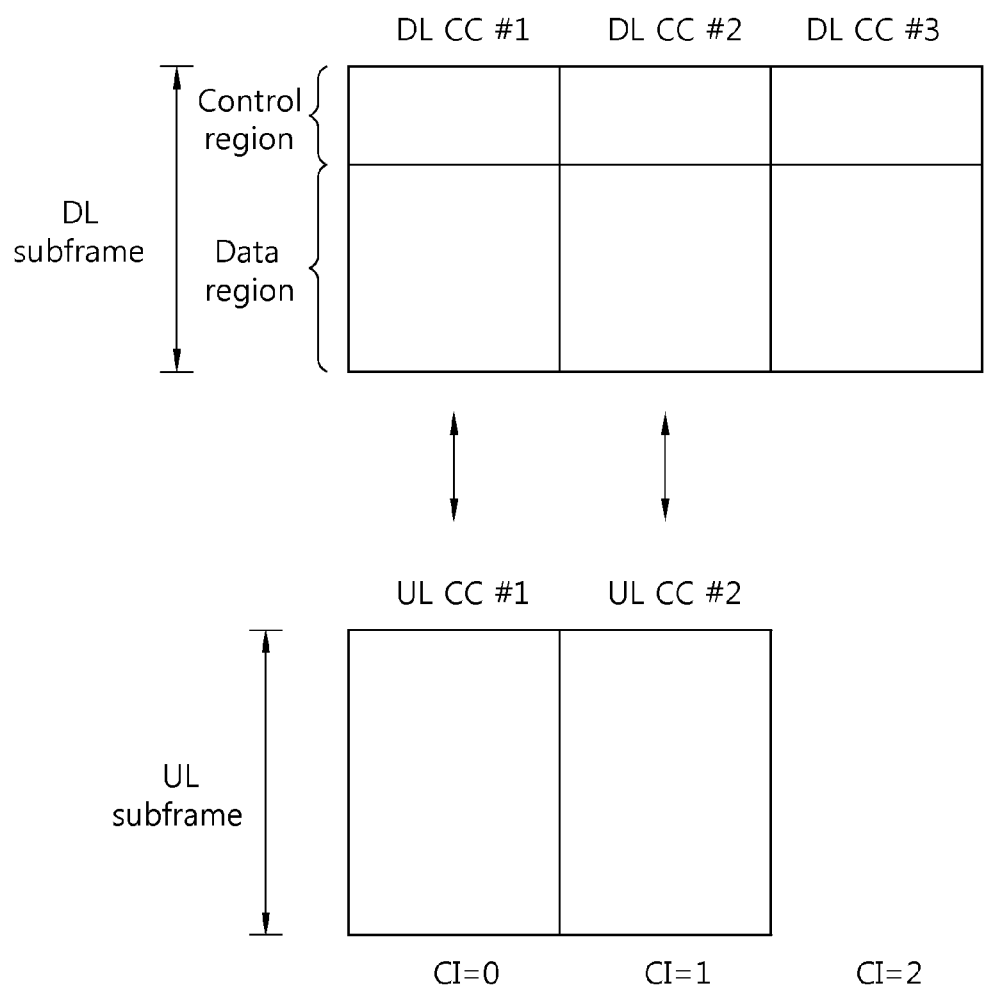
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CC. The UE can transmit a plurality of UL transport blocks simultaneously via a plurality of UL CCs.

It is assumed that a pair of a DL CC #1 and a UL CC #1 is a first serving cell, a pair of a DL CC #2 and a UL CC #2 is a second serving cell, and a DL CC #3 is a third serving cell. Each serving cell can be identified by using a cell index (CI). The CI may be cell-specific or UE-specific. Herein, CI=0, 1, 2 are assigned to the first to third serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009-05), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n depending on the UL-DL configuration in 3GPP LTE. Herein, k∈K, where M is the number of elements of a set K.

TABLE 5

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=4. Since 4 PDCCHs can be received from 4 DL subframes, the UE can acquire 3 PUCCH resources $n^{(1)}_{PUCCH,0}$, $n^{(1)}_{PUCCH,1}$, $n^{(1)}_{PUCCH,2}$ and $n^{(1)}_{PUCCH,3}$. Assume that b(0) and b(1) represent ACK/NACK of 2 bits, an example of channel selection is shown in Table 6 below.

TABLE 6

| HARQ-ACK(1), HARQ-ACK(2), HARQ-ACK(3), HARQ-ACK(4) | Resource Index | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, NACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected.

For example, if the UE successfully receives 4 DL transport blocks in 4 DL subframes, the UE perform QPSK modulation on bits (1, 1) by using $n^{(1)}_{PUCCH,1}$, and transmits the modulated bits as ACK/NACK response using the PUCCH format 1b. If the UE fails to decode the DL transport block at a first (i=1) DL subframe and succeeds in the decoding of the remaining transport blocks, the UE perform QPSK modulation on bits (0, 1) by using $n^{(1)}_{PUCCH,3}$, and transmits the modulated bits as ACK/NACK response using the PUCCH format 1b.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of a DL subframe (or PDCCH).

Assume that M=4, and the BS transmits 4 DL transport blocks through 4 DL subframes. The UE misses the PDCCH in the second DL subframe and thus cannot receive a second transport block at all, and can receive only the remaining first, third and fourth transport blocks. In this case, if bundling is used, the UE erroneously transmits ACK.

In order to solve this error, a downlink assignment index (DAI) is included in a DL grant on the PDCCH. The DAI indicates an accumulative number of the PDCCH having assigned PUSCH transmission. A value of the 2-bit DAI is sequentially increased from 1, and a modulo-4 operation is applicable again from DAI=4. If M=5 and all of 5 DL subframes are scheduled, the DAI can be included in a corresponding PDCCH in the order of DAI=1, 2, 3, 4, 1.

In case of considering the TDD configuration of DL:UL=9:1, the DAI value in which the modulo-4 operation is applied can be represented as follows.

DAI for the PDSCH which is scheduled in the first, the fifth or the ninth=1

DAI for the PDSCH which is scheduled in the second or the sixth=2

DAI for the PDSCH which is scheduled in the third or the seventh=3

DAI for the PDSCH which is scheduled in the fourth or the eighth=4

Figure 6:
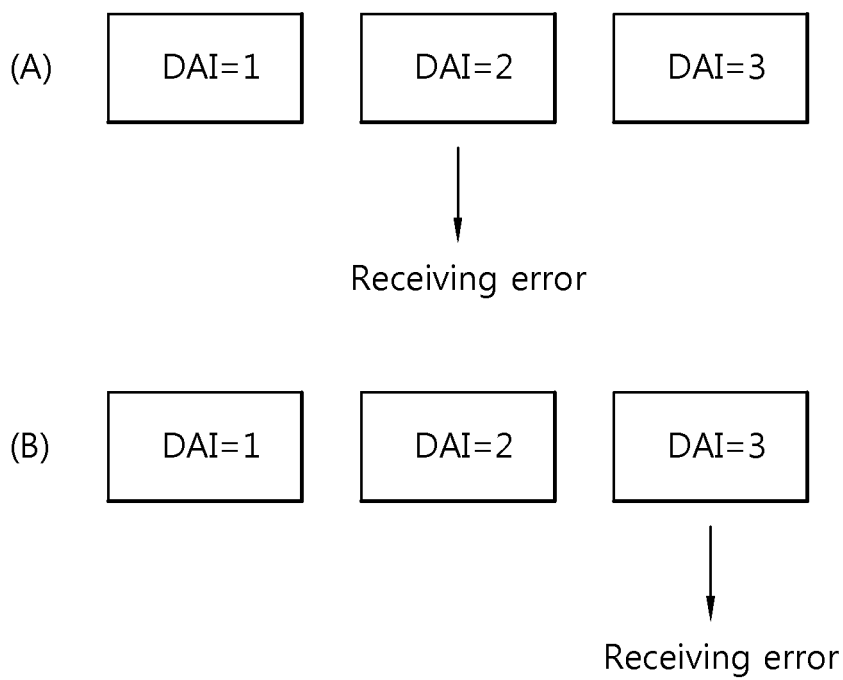
FIG. 6 shows examples of error detection using a downlink assignment index (DAI).

FIG. 6 shows examples of error detection using a DAI.

In FIG. 6A, a UE misses a second DL subframe, and thus cannot receive DAI=2. In this case, the UE receives DAI=3, and thus can know missing of a DL subframe corresponding to DAI=2.

In FIG. 6B, the UE misses a third DL subframe, and thus cannot receive DAI=3. In this case, the UE cannot know missing of the third DL subframe. However, in 3GPP LTE, a PUCCH is configured on the basis of a first CCE of a last received PDCCH so that a BS can know missing of the DL subframe. That is, the UE transmits ACK/NACK by using a PUCCH resource based on a PUCCH resource of a DL subframe corresponding to DAI=2. The BS can know the missing of the third DL subframe since the ACK/NACK is received by using the PUCCH resource corresponding to the DL subframe with DAI=2 rather than the DL subframe with DAI=3.

Meanwhile, as a plurality of serving cells are used, an additional PUCCH format 3 is under discussion in addition to the PUCCH format of the conventional 3GPP LTE, in preparation for a case in which the number of ACK/NACK bits is insufficient.

Figure 7:
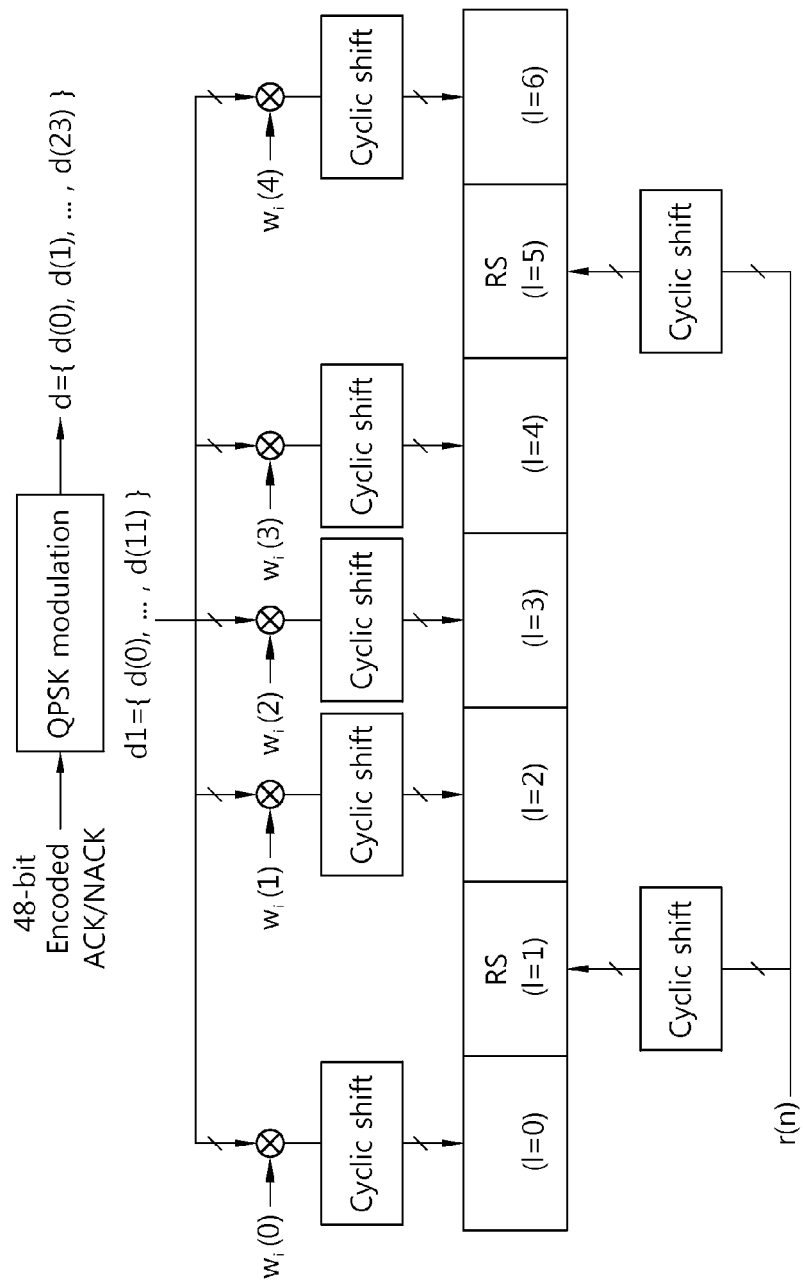
FIG. 7 shows an example of a structure of a PUCCH format 3 in a normal CP.

FIG. 7 shows an example of a structure of a PUCCH format 3 in a normal CP.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence d={d(0), d(1), . . . , d(23)} is generated by performing QPSK modulation on a 48-bit encoded ACK/NACK signal. d(n)(n=0, 1, . . . , 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. FIG. 5 shows that the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 5 below can be selected in accordance with an orthogonal sequence index i.

TABLE 7

| Index (i) | [$w_i(0), w_i(1), w_i(2), w_i(3), w_i(4)$] |
|---|---|
| 0 | [ +1, +1, +1, +1, +1 ] |
| 1 | [+1, $e^{j2\pi/5}$, $e^{j4\pi/5}$, $e^{j6\pi/5}$, $e^{j8\pi/5}$ ] |
| 2 | [+1, $e^{j4\pi/5}$, $e^{j8\pi/5}$, $e^{j2\pi/5}$, $e^{j6\pi/5}$ ] |
| 3 | [+1, $e^{j6\pi/5}$, $e^{j2\pi/5}$, $e^{j8\pi/5}$, $e^{j4\pi/5}$ ] |
| 4 | [+1, $e^{j8\pi/5}$, $e^{j6\pi/5}$, $e^{j4\pi/5}$, $e^{j2\pi/5}$ ] |

Two slots in the subframe can use different orthogonal sequence indices.

Each spread symbol sequence is cyclically shifted by a cell-specific CS value $n^{cell}_{cs}(n_s,l)$. Each cyclically shifted symbol sequence is transmitted by being mapped to a corresponding data OFDM symbol.

$n^{cell}_{cs}(n_s,l)$ is a cell-specific parameter determined by a pseudo-random sequence which is initialized on the basis of a physical cell identity (PCI). $n^{cell}_{cs}(n_s,l)$ varies depending on a slot number $n_s$ in a radio frame and an OFDM symbol number l in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

The resource index for the PUCCH format 1a/1b is acquired from the resource of PDCCH which is received most recently. The resource index for the PUCCH format 3 is indicated by ACK/NACK resource indicator (ARI).

First, a BS notifies a plurality of candidate resource indices which is available by using higher layer message such as a RRC message to a UE. And, the BS notifies a selected resource index among the plurality of candidate resource indices through DL grant on the PDCCH. The field that indicates the selected resource index in the DL grant is called the ARI.

For example, the BS notifies 4 candidate resource indices to the UE through the RRC message. And the ARI on the PDCCH that schedules the PDSCH indicates one of the 4 candidate resource indices, and the PUCCH format 3 is configured from the selected resource index.

In order to prevent the bit number of DL grant from increasing, the ARI borrows a transmit power command (TPC) of the existing DCI.

Now, semi-persistent scheduling (SPS) will be described.

In general, a UE first receives a DL grant on a PDCCH, and subsequently receives a transport block through a PDSCH indicated by the DL grant. This implies that PDCCH monitoring is accompanied in every transport block, which is called dynamic scheduling.

The SPS pre-defines a PDSCH resource, and the UE receives a transport block through the pre-defined resource without PDCCH monitoring.

Figure 8:
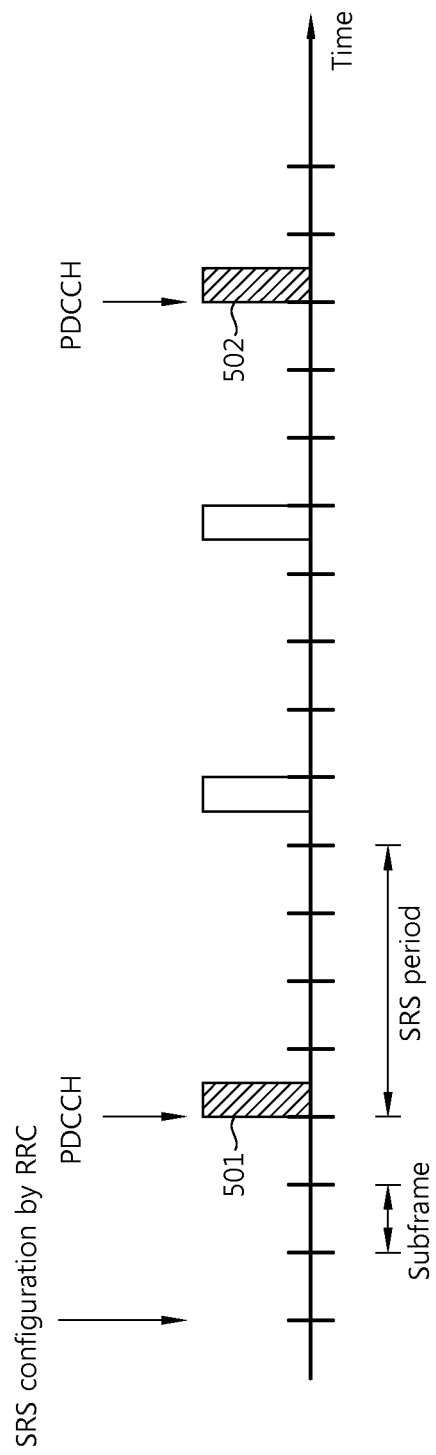
FIG. 8 shows an example of SPS in 3GPP LTE. Although DL SPS is shown herein, the same is also applicable to UL SPS.

FIG. 8 shows an example of SPS in 3GPP LTE. Although DL SPS is shown herein, the same is also applicable to UL SPS.

First, a BS sends an SPS configuration to a UE by using radio resource control (RRC). The SPS configuration includes an SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When NDI=0 is included in DCI on the PDCCH 501, combinations of values of several fields (e.g., a transmit power command (TPC), a cyclic shift (CS) of a demodulation reference signal (DM-RS), a modulation and coding scheme (MCS), a redundancy version (RV), an HARQ process number, and a resource allocation) included in the DCI are used in SPS activation and deactivation.

When the SPS is activated, even if a DL grant on the PDCCH is not received, the UE receives a transport block on a PDSCH at an SPS period. The PDSCH received without the PDCCH is called an SPS PDSCH.

Thereafter, the UE monitors a PDCCH 502 in which a CRC is masked with the SPS-C-RNTI, and confirms deactivation of the SPS.

According to 3 GPP LTE, the PDCCH indicating the activation of the SPS does not require an ACK/NACK response, but the PDCCH indicating the deactivation of the SPS requires the ACK/NACK response. Hereinafter, a DL transport block may include the PDCCH indicating the deactivation of the SPS.

According to the conventional PUCCH formats 1a/1b, a resource index $n^{(1)}_{PUCCH}$ is derived from the PDCCH. However, according to the SPS, the PDCCH associated with the PDSCH is not received, and thus a pre-assigned resource index is used.

The BS notifies a plurality of candidate resource indices to the UE for the SPS through the RRC message. Through the PDCCH 501 that activates the SPS, the BS notifies the resource index which is used among the plurality of candidate resource indices to the UE.

The UE may transmit channel state information (CSI) in periodic or aperiodic manner to the BS. The periodic transmission of the CSI that is performed by the UE to the BS is referred to as a periodic CSI reporting, and the aperiodic transmission of the CSI is performed by that the UE to the BS is referred to as a aperiodic CSI reporting. The periodic reporting and the aperiodic reporting will be described below.

(1) Periodic CSI reporting

The UE may be configured to semi-statically feedback the CSI (i.e., a channel quality indicator (CQI), a precoding matrix index (PMI), a precoding type indicator (PTI) and/or a rank index (RI)) by a higher layer. In case of performing the periodic CSI reporting, the UE may transit the CSI based on a CSI reporting mode to the BS. Table 8 below classifies the CSI reporting modes based on the PMI feedback type and the PUCCH CQI feedback type.

TABLE 8

| PUCCH CQI | PMI Feedback Type | |
|---|---|---|
| Feedback Type | No PMI | Single PMI |
| Wideband (wideband CQI) | Mode 1-0 | Mode 1-1 |
| UE Selected (subband CQI) | Mode 2-0 | Mode 2-1 |

Referring to Table 8, the CSI reporting modes may be classified into 4 different modes. Each CIS reporting mode may be sorted by whether the PMI is transmitted and whether the frequency band through which the CQI is transmitted is wideband or UE-selected subband. The CSI reporting modes used for the transmission mode may be as follows.

The CSI reporting modes according to the transmission mode

Transmission mode 1: Modes 1-0, 2-0
Transmission mode 2: Modes 1-0, 2-0
Transmission mode 3: Modes 1-0, 2-0
Transmission mode 4: Modes 1-1, 2-1
Transmission mode 5: Modes 1-1, 2-1
Transmission mode 6: Modes 1-1, 2-1
Transmission mode 7: Modes 1-0, 2-0
Transmission mode 8: Modes 1-1, 2-1 in case that a UE is configured to report the PMI/RI, Modes 1-0, 2-0 in case that a UE is configured not to report the PMI/RI
Transmission mode 9: Modes 1-1, 2-1 in case that a UE is configured to report the PMI/RI and the number of CSI-RS port is greater than 1, Modes 1-0, 2-0 in case that a UE is configured not to report the PMI/RI or the number of CSI RS port is 1
Transmission mode 10: Modes 1-1, 2-1 in case that a UE is configured to report the PMI/RI and the number of CSI-RS port is greater than 1, Modes 1-0, 2-0 in case that a UE is configured not to report the PMI/RI and the number of CSI RS port is 1

The transmission mode of UE may be configured as represented in Table 9 below depending on a transmission method of the PDSCH which is related to the PDCCH.

TABLE 9

| Transmission mode | Transmission scheme of PDSCH corresponding to PDCCH |
|---|---|
| Mode 1 | Single antenna port, port 0 |
| Mode 2 | Transmit diversity |
| Mode 3 | Large delay CDD or Transmit diversity |
| Mode 4 | Closed-loop spatial multiplexing or Transmit diversity |
| Mode 5 | Transmit diversity or Multi-user MIMO |
| Mode 6 | Transmit diversity or Closed-loop spatial multiplexing using a single transmission layer |
| Mode 7 | If the number of PBCH antenna ports is one, Single-antenna port, port 0 is used, otherwise Transmit diversity. Single-antenna port, port 5 |
| Mode 8 | If the number of PBCH antenna ports is one, Single-antenna port, port 0 is used, otherwise Transmit diversity. Dual layer transmission, port 7 and 8 or single-antenna port, port 7 or 8 |
| Mode 9 | Non-MBSFN subframe: If the number of PBCH antenna ports is one, Single-antenna port, port 0 is used, otherwise Transmitdiversity. MBSFN subframe: Single-antenna port, port 7 Up to 8 layer transmission, ports 7-14 |

In order to transmit the CSI, the CSI reporting type which is configured with a specific period and offset may be defined. The CSI reporting type defined may be as follows.

Type 1 report supporting a CQI feedback in a subband which is selected by a UE

Type 1a report supporting a CQI feedback and a second PMI feedback which is selected by a UE Type 2, type 2b, and type 2c report supporting a wideband CQI and a PMI feedback Type 3 report supporting a RI feedback Type 4 report supporting a wideband CQI Type 5 report supporting a RI and a wideband PMI feedback Type 6 supporting a RI and a PTI feedback A period $N_{pd}$ and an offset $N_{OFFSET,CQI}$ of the subframe in order for a UE to report the CQI/PMI for each serving cell may be decided by a parameter cqi-pmi-ConfigIndex $I_{CQI,PMI}$. Also $M_{RI}$ a period $M_{RI}$ and an offset $N_{OFFSET,RI}$ of the subframe in order for a UE to report the RI for each serving cell may be decided by a parameter ri-ConfigIndex $I_{RI}$. The parameter cqi-pmi-ConfigIndex and the parameter ri-ConfigIndex may be configured based on a higher layer signaling. The offset $N_{OFFSET,RI}$ for the RI may be configured as a value among values of a set $\{0,-1,\ldots,-(N_{pd}-1)\}$ If the UE is configured to report the CSI for one or more CSI subframe sets, the parameter cqi-pmi-ConfigIndex and the parameter ri-ConfigIndex may be configured for each CSI subframe set.

(2) Aperiodic CSI reporting

In case that an aperiodic CQI request which is a control signal for requesting to transmit the CQI is included in a PUSCH scheduling control signal (UL grant) that a BS transmits through the PDCCH, a UE may report the aperiodic CSI through the PUSCH.

Table 10 below represents modes at the time of the CQI/PMI/RI being transmitted through the PUSCH.

TABLE 10

| PUSCH CQI feedback type | PMI Feedback Type | | |
|---|---|---|---|
| | No PMI | Single PMI | Multiple PMI |
| Wideband (wideband CQI) | | | Mode 1-2 |
| UE Selected (subband CQI) | Mode 2-0 | | Mode 2-2 |
| Higher Layer-configured (subband CQI) | Mode 3-0 | Mode 3-1 | |

In aperiodic CSI reporting, each CSI reporting mode may report the CSI according to the transmission mode depending on various modes as described below.

The CSI reporting modes according to the transmission mode

Transmission mode 1: Modes 2-0, 3-0
Transmission mode 2: Modes 2-0, 3-0
Transmission mode 3: Modes 2-0, 3-0
Transmission mode 4: Modes 1-2, 2-2, 3-1
Transmission mode 5: Modes 3-1
Transmission mode 6: Modes 1-2, 2-2, 3-1
Transmission mode 7: Modes 2-0, 3-0
Transmission mode 8: Modes 1-2, 2-2, 3-1 in case that a UE is configured to report the PMI/RI, Modes 2-0, 3-0 in case that a UE is configured not to report the PMI/RI
Transmission mode 9: Modes 1-2, 2-2, 3-1 in case that a UE is configured to report the PMI/RI and the number of CSI-RS port is greater than 1, Modes 2-0, 3-0 in case that a UE is configured not to report the PMI/RI or the number of CSI RS port is 1

Transmission mode 10: Modes 1-2, 2-2, 3-1 in case that a UE is configured to report the PMI/RI and the number of CSI-RS port is greater than 1, Modes 2-0, 3-0 in case that a UE is configured not to report the PMI/RI and the number of CSI RS port is 1

The UE may get the CSI transmission mode to be configured through a higher layer, and transmit all of the CQI, PMI and/or RI through the PUSCH of the same subframe based on the received CSI transmission mode. Each mode of the CSI transmission mode may be as follows.

1-1) Mode 1-2

In mode 1-2, a precoding matrix may be selected under the assumption that data is transmitted through only a subband for each subband. A UE may generate a CQI by assuming the precoding matrix selected for all of the system band or the band (set S) designated by the higher layer. The UE may transmit the PMI value of the CQI and each subband. A size of each subband may be changed depending on a size of the system band.

1-2) Mode 2-0

In mode 2-0, a UE may select M subbands which are preferred for the band (set S) designated by the system band or the higher layer. The UE may generate one CQI value under the assumption that the UE transmits data for selected M subbands. The UE may additionally generate one CQI (wideband CQI) value for the system band or set S. In case that there is a plurality of codewords for M subbands selected, the CQI value for each codeword may be defined as below in a differential form.

Differential CQI=An index that corresponds to the CQI value for the selected M subbands−wideband CQI index The UE transmits the information of location of the selected M subbands, one CQI value generated for the selected M subbands and the CQI value generated for all bands or set S. In this time, a size and M value for the subband may be changed depending on a size of system band.

1-3) Mode 2-2

In mode 2-2, a UE may select a location of M preferred subbands and a single precoding matrix for the M preferred subbands at the same time under the assumption that the UE transmits data through the selected M subbands. The CQI value for the M preferred subbands may be defined for each codeword. The UE may additionally generate a wideband CQI values for a system band or set S. The UE may transmit information of the location of M preferred subbands, one CQI value for the selected M subbands, the single precoding matrix for the M preferred subbands, the wideband precoding matrix index, and the wideband CQI values. In this time, a size and M value for the subband may be changed according to the size of system band.

1-4) Mode 3-0

In mode 3-0, a UE may generate a wideband CQI value. The UE may generate a CQI value for each subband under the assumption that the UE transmits data through each subband. In this time, even if RI is greater than 1, the CQI value represents only for the first codeword.

1-5) Mode 3-1

In mode 3-1, a UE may generate a single precoding matrix for a system band or set S. The UE may generate a subband CQI for each codeword by assuming the single precoding matrix generated for each subband. The UE generates a wideband CQI by assuming the single precoding matrix. The CQI value for each subband may be represented as a differential form.

Subband CQI=subband CQI index−wideband CQI index

A size of the subband may be changed depending on a size of the system band.

A UE may transmit a sounding reference signal (SRS) as well as the CSI in periodic or aperiodic manner.

The SRS transmission may be divided into 1) periodic SRS transmission and 2) aperiodic SRS transmission. The periodic SRS transmission may be performed in a subframe which is triggered by a periodic SRS configuration. The periodic SRS configuration includes a SRS periodicity and a SRS subframe offset. When the periodic SRS configuration is given, a wireless apparatus may periodically transmit the SRS in the subframe that satisfies the periodic SRS configuration. Hereinafter, the subframe in which the SRS may be transmitted is referred to as SRS subframe. In the periodic SRS transmission and the aperiodic SRS transmission, the SRS may be transmitted in the SRS subframe which is decided with UE-specific manner.

In the SRS subframe, a location of the OFDM symbol in which the SRS is transmitted may be fixed. For example, the SRS may be transmitted in the last OFDM symbol of the SRS subframe. The OFDM symbol in which the SRS is transmitted is referred to as a sounding reference symbol.

In 3GPP LTE, a cell-specific SRS subframe and a UE-specific SRS subframe are defined for the periodic SRS transmission. The cell-specific SRS subframe is commonly configured in a wireless apparatus in a cell. As shown in section 5.5.3 of 3GPP TS 36.211 V8.7.0, the cell-specific SRS subframe may be configured with a configuration period $T_{SFC}$ and a transmission offset $T_{SFC}$ by the variable srs-Subframe-Config. The cell-specific SRS subframe is the subframe that satisfies floor (ns/2) mod $T_{SFC} \epsilon T_{SFC}$ (ns is a slot number in a radio frame).

Table 11 below is an example of configurations for the cell-specific SRS subframe in FDD.

TABLE 11

| srs-Sub-frameConfig | Periodicity $T_{SFC}$ | Transmission Offset $\Delta_{SFC}$ |
|---|---|---|
| 0 | 1 | {0} |
| 1 | 2 | {0} |
| 2 | 2 | {1} |
| 3 | 5 | {0} |
| 4 | 5 | {1} |
| 5 | 5 | {2} |
| 6 | 5 | {3} |
| 7 | 5 | {0,1} |
| 8 | 5 | {2,3} |
| 9 | 10 | {0} |
| 10 | 10 | {1} |
| 11 | 10 | {2} |
| 12 | 10 | {3} |
| 13 | 10 | {0,1,2,3,4,6,8} |
| 14 | 10 | {0,1,2,3,4,5,6,8} |
| 15 | reserved | reserved |

The UE-specific SRS subframe is configured by signaling which is specific to a wireless apparatus. As shown in section 8.2 of 3GPP TS 36.213 V8.7.0, the UE-specific SRS subframe is configured with a SRS periodicity $T_{SRS}$ and a SRS subframe offset $T_{offset}$ by the variable, SRS configuration index $I_{SRS}$. In FDD, the UE-specific SRS subframe is a subframe that satisfies $(10 \cdot n_f + k_{SRS} - T_{offset,1})$ mod $T_{SRS,1} = 0$ (where, $n_f$ is a system frame number and $k_{SRS}=\{0, 1, 9, \ldots, 9\}$ is a subframe number within a radio frame).

Table 12 below is an example of configurations for the UE-specific SRS subframe in FDD.

TABLE 12

| SRS configuration index $I_{SRS}$ | SRS periodicity $T_{SRS}$ (ms) | SRS subframe offset $T_{offset}$ |
|---|---|---|
| 0-1 | 2 | ISRS |
| 2-6 | 5 | ISRS-2 |
| 7-16 | 10 | 1SRS-7 |
| 17-36 | 20 | ISRS-17 |
| 37-76 | 40 | ISRS-37 |
| 77-156 | 80 | ISRS-77 |
| 157-316 | 160 | ISRS-157 |
| 317-636 | 320 | ISRS-317 |
| 637-1023 | reserved | reserved |

FIG. 9 shows an example of a periodic SRS transmission.

When a configuration period of a cell-specific SRS subframe is $T_{SFC}=2$ and a SRS period of the cell-specific SRS subframe is $T_{SRS}=10$, a UE-specific SRS subframe belongs to the cell-specific SRS subframe and a wireless apparatus may transmit the SRS in the cell-specific SRS subframe.

In an aperiodic SRS transmission, when a SRS request of a BS is detected, the wireless apparatus transmits the SRS. A SRS configuration is prepared in advance for the aperiodic SRS transmission. The SRS configuration also includes a SRS periodicity $T_{SRS}$ and a SRS subframe offset $T_{offset}$.

The SRS request for triggering the aperiodic SRS transmission may be included in DL grant or UL grant on the PDCCH. For example, if the SRS request is 1 bit, '0' may represent a negative SRS request, and '1' may represent an affirmative SRS request. If the SRS request is 2 bits, '00' may represent the negative SRS request and the remainder may represent the affirmative request, but one among a plurality of SRS configurations may be selected for the SRS transmission.

If the DL grant or UL grant may not include a CI, the SRS may be transmitted in a serving cell of the PDCCH in which the SRS request is detected. If the DL grant or UL grant may include the CI, the SRS may be transmitted in a serving cell indicated by the CI.

It is assumed that the affirmative SRS request is detected in subframe n of serving cell c. When the affirmative SRS request is detected, the SRS is transmitted in a first subframe that satisfies the case of $T_{SRS}>2$ in n+k, k≥4, and time division duplex (TDD) and satisfies the case of (10*nf+kSRS−Toffset) mod $T_{SRS}=0$ in frequency division duplex (FDD). In FDD, the subframe index kSRS=\{0, 1, \ldots, 9\} in a frame nf, and in TDD, kSRS is defined in a predetermined table. In TDD of TSRS=2, the SRS is transmitted in a first subframe that satisfies (kSRS−Toffset) mod 5=0.

Figure 10:
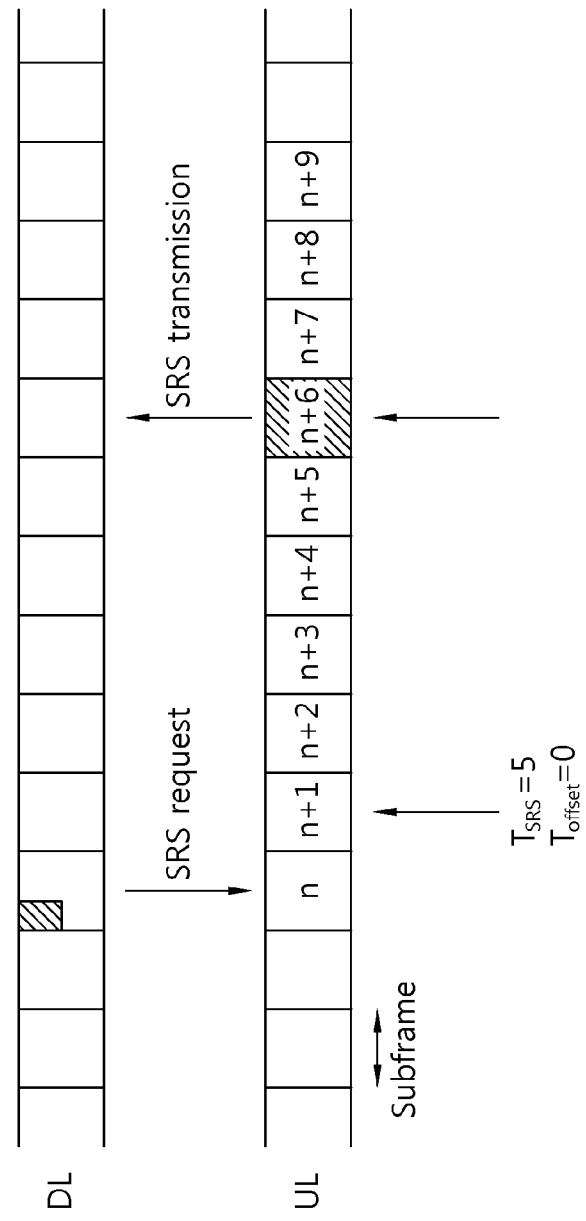
FIG. 10 shows an example of an aperiodic SRS transmission.

FIG. 10 shows an example of an aperiodic SRS transmission. It is assumed that the SRS configuration may include a SRS period TSRS=5 and a SRS subframe offset Toffset=0.

It is assumed that subframe n+1 and subframe n+6 are the subframes in which the SRS transmission is available, according to the SRS configuration.

If a SRS request is detected on the PDCCH of subframe n, the SRS is transmitted in subframe n+6 which is a first subframe that satisfies the SRS configuration after subframe n+4.

In subframe i of serving cell c, a transmission power PSRS, c(i) of a sounding reference symbol is defined as below.

$$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)+\alpha_c(j)PL_c+f_c(i)\} \quad \text{<Equation>}$$

Herein, PCMAX,c(i) represents a transmission power configured in subframe i of serving cell c, PSRS_OFFSET,c(m) is a 4-bit UE-specific parameter which is semi-statically configured by a higher layer for m=0 and m=1 of serving cell c, if it is periodic SRS, m=0, and if it is aperiodic SRS, m=1, MSRSc is a bandwidth of the SRS transmission in subframe i of serving cell c, PO_PUSCH,c(j) is a parameter which is comprised of the summation of PO_NOMINAL_PUSCH,c(j) which is a cell-specific nominal component given by a higher layer in subframe i of serving cell c and PO_UE_PUSCH,c(j) which is a UE-specific component, j=1, αc(j) is a 3-bit parameter given by a higher layer for serving cell c, j=1, PLc is an estimated value of downlink pathloss calculated in a wireless apparatus for serving cell c, and fc(i) is a current PUSCH power control state for serving cell c.

In the existing 3GPP LTE Rel-10, a UE may transmit control information to a BS through user control information (UCI). The UCI may include information such as CSI, SRS, HARQ-ACK, SR (scheduling request), PMI, RI, CQI, etc. For example, the CQI may be the information related to propagation state information of a UE for performing adaptive modulation and coding (AMC), the PMI may be the precoding index information which is expected to process at a transmitting end to be helpful for separating propagation path, and the RI may be the information representing selectance of propagating path due to reflective wave.

When a UE transmit the UCI, the uplink resources for transmitting each UCI may collide. In this case, it may be configured to transmit a specific UCI among the colliding UCIs. For example, in the existing 3GPP LTE Rel-10, it may be assumed the case that simultaneous transmission of HARQ-ACK and other UCI except the HARQ-ACK is not configured in a UE. In this case, if resources are allocated such that HARQ-ACK and other UCI except the HARQ-ACK are transmitted at the same time, the UE transmits only HARQ-ACK, but does not transmit other UCI except the HARQ-ACK. That is, the UE is configured to transmit the HARQ-ACK with higher priority than other UCI except the HARQ-ACK such that the HARQ-ACK and other UCI except the HARQ-ACK are not transmitted at the same time.

Such a priority transmission for the HARQ-ACK is applied regardless of whether the CSI and SRS allocated to a control channel at the same time is the information of being periodically reported to the BS or the information of being aperiodically reported. Also, the priority transmission for the HARQ-ACK is determined regardless of the state (ACK/NACK/DTX) of HARQ-ACK. The state of HARQ-ACK may be one of the following 3 states.

1) ACK: Decoding success of a transmission block (or codeword) which is received on the PDSCH, 2) NACK: Decoding failure of a transmission block (or codeword) which is received on the PDSCH, 3) Discontinuous transmission (DTX): Transmission block receiving failure on the PDSCH. This signifies the reception failure of the PDCCH for the case of dynamic scheduling.

In case of cell aggregation, a bit number for transmitting the HARQ-ACK may be determined based on a configured cell. In case of cell aggregation, the PDSCH data which is scheduled in at least one cell may be transmitted to the UE. The UE may transmit the HARQ-ACK through an appropriate PUCCH or PUSCH resource by processing the rest of HARQ-ACK information except the HARQ-ACK for the corresponding BS to be NACK.

The cell aggregation (or carrier aggregation) may be performed as the following methods. The carrier aggregation may be performed based on a primary carrier component (PCC) of P-cell and a secondary carrier component (SCC) of one or more S-cell(s). If there are 2 or more cells, the BS may determine one cell to be P-cell and another cell to be S-cell. The BS may aggregate the carrier components (CCs) of P-cell and S-cell which are determined, and transmit data to the BS by using the aggregated frequency bandwidth. The P-cell and S-cell perform the carrier aggregation through configuration and activation operations, and transmit or receive data through the aggregated frequency bandwidth. The S-cell may be activated by the P-cell. As a particular operation, the UE may connect radio resource control (RRC) through the PCC of P-cell. In addition, the UE may try to perform random access to the BS through a physical random access channel (PRACH) based on the signal which is signaled through the PCC. That is, the UE may perform initial connection establishment process or connection re-establishment process to the BS through the PCC in the carrier aggregation environment. The SCC of S-cell may be used for providing an additional radio resource. In order to perform the carrier aggregation that adds the SCC to the PCC, the UE should perform a neighbor cell measurement for acquiring the information of neighboring cell. The BS may determine whether to aggregate the SCC in the PCC based on the neighbor cell measurement performed by the UE.

In case of following cases in the FDD and TDD methods, the UE may not transmit the information of HARQ-ACK through the PUCCH.

It is assumed the case that a UE transmits a plurality of HARQ-ACKs by using PUCCH format 1b with channel selection in FDD method. In this case, if the state of HARQ-ACK for the P-cell is DTX and the state of HARQ-ACK for the S-cell is NACK or DTX (hereinafter, noted as NACK/DTX), the UE may not transmit the information of HARQ-ACK through the PUCCH.

It is assumed the case that a UE transmits a plurality of HARQ-ACKs by using PUCCH format 1b with channel selection in TDD method. In addition, it may be assumed the case that M, which is the number of downlink subframe allocated to the HARQ-ACK which is transmitted in an uplink subframe, is 2 or lower. In this case, if the state of HARQ-ACK which is mapped to the downlink subframe having the value of DAI=1 for the plurality of downlink subframes transmitted in each cell is DTX and the state of HARQ-ACK for the rest of DAI having a value other than 1 is NACK/DTX, the UE may not transmit the information of HARQ-ACK through the PUCCH.

Also, in TDD method, it may be assumed the case that the number M of downlink subframe allocated to one uplink subframe is 3 or more. In this case, if the state of HARQ-ACK for DAI=1 of the P-cell is DTX and the state of HARQ-ACK for DAI=1 of the S-cell is NACK/DTX, the UE may not transmit the information of HARQ-ACK through the PUCCH.

On the other hand, in case that a UE transmits the HARQ-ACK by using PUCCH format 3, in the case except that the state of HARQ-ACK for all cells are DTX, the UE transmits the HARQ-ACK through the PUCCH by processing DTX to be NACK. In general, a BS may not distinguish what is the PDSCH data that is responded with DTX. Therefore, it may be ineffective to transmit by processing DTX to be NACK always in the aspect of determining whether an error is for the PDCCH received by the UE or for the PDSCH.

As described above, in the conventional LTE system, in case that the simultaneous transmission of the HARQ-ACK and other UCI except the HARQ-ACK is not configured, when a UE transmits the HARQ-ACK through the PUCCH, the other UCI may be dropped without being transmitted regardless of the state information of HARQ-ACK. However, the case that the other UCI may be dropped without being transmitted regardless of the state information of HARQ-ACK, which brings loss in downlink throughput. Accordingly, in the embodiment of the present invention, when transmitting data through the uplink control channel, it may be determined by considering the HARQ-ACK state additionally whether to drop the UCI which is transmitted at the same time through the uplink control channel. By using the method, the transmission efficiency of the uplink channel and downlink channel may be increased.

The determination of whether to drop the UCI according to the embodiment of the present invention may be applied to the subframe where collide the HARQ-ACK and the resource that is transmitted by the rest of UCI except the HARQ-ACK or the subframe where collide the HARQ-ACK and the resource that transmits the SRS. Also, it may be determined by a higher layer whether to apply the method for determining dropping the HARQ-ACK according to the embodiment of the present invention. The higher layer may transmit the information on whether to apply the method for determining to drop the HARQ-ACK to a UE. Hereinafter, in the embodiment of the present invention, the followings are introduced; a method for determining to drop the HARQ-ACK depending on the HARQ-ACK state in case of colliding the HARQ-ACK and periodic CSI reporting, a method for determining whether to drop the HARQ-ACK depending on the HARQ-ACK state in case of colliding the HARQ-ACK and the SRS, and a method for controlling uplink power depending on the HARQ-ACK state. Hereinafter, in the embodiment of the present invention, it is described assuming the case that the HARQ-ACK and UCI information are allocated to the same resource at the same time on a UE to which the HARQ-ACK and the UCI are configured not to be transmitted at the same time.

1. A method for determining whether to drop the HARQ-ACK depending on the HARQ-ACK state in case of colliding the HARQ-ACK and the periodic CSI reporting In the conventional LTE system, the periodic CSI reporting method is defined as a variety of types. The periodic CSI reporting type may be classified different reporting types depending on transmission of the kinds of CSIs which are reported to the BS such as RI/PTI/PMI/CQI and so on. According to the embodiment of the present invention, it may be determined whether to drop a HARQ-ACK based on the PUCCH CSI reporting mode and a PUCCH CSI reporting type depending on the HARQ-ACK state.

Figure 11:
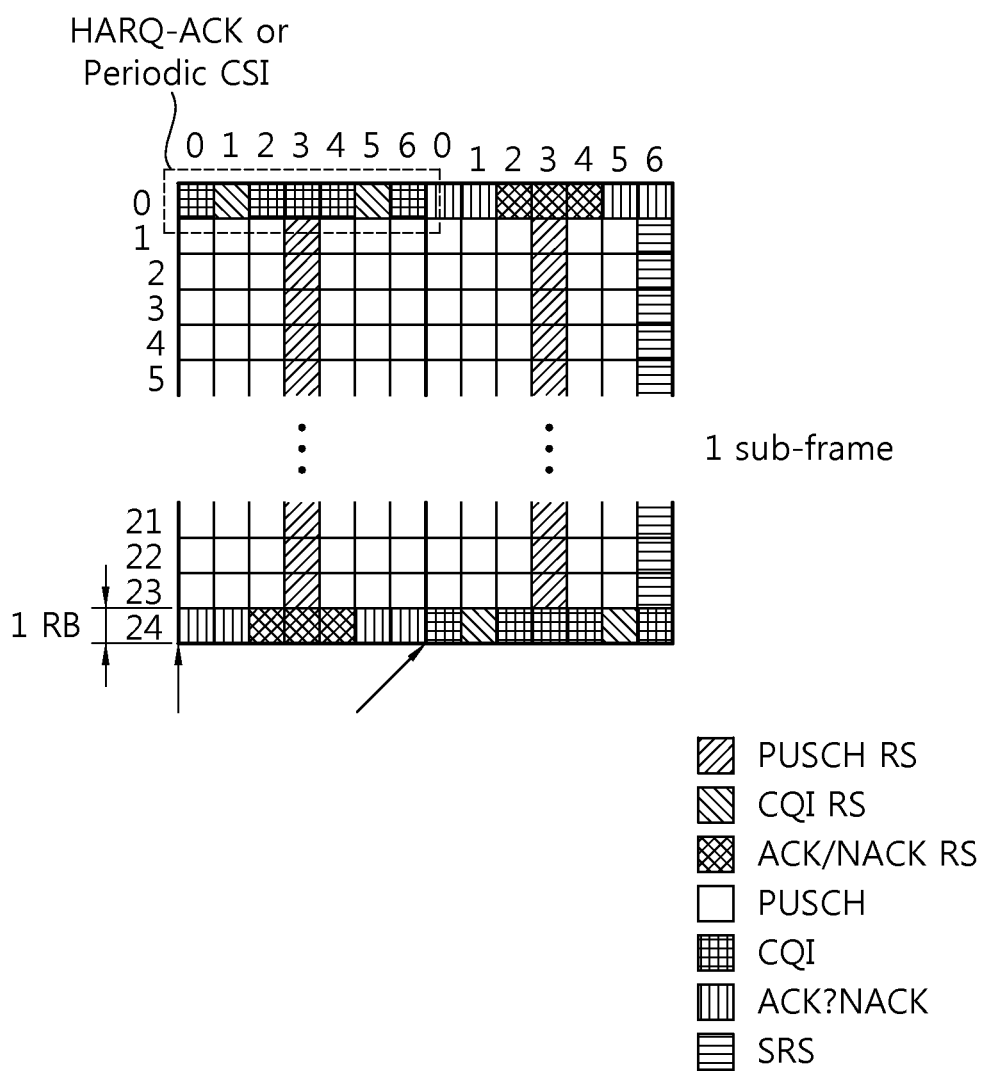
FIG. 11 is a conceptual diagram representing a method of determining whether to drop the HARQ-ACK depending on the HARQ-ACK state according to the embodiment of the present invention.

FIG. 11 is a conceptual diagram representing a method of determining whether to drop the HARQ-ACK depending on the HARQ-ACK state according to the embodiment of the present invention.

Referring to FIG. 11, there may occur the case that both resources are overlapped, which are the resource to which the HARQ-ACK is transmitted and the resource to which the periodic CSI is transmitted. In this case, in the conventional LTE system, the HARQ-ACK is preferentially transmitted rather than the periodic CSI not considering the state information of the HARQ-ACK to be transmitted. However, in the embodiment of the present invention, it may be determined which information might be dropped among the HARQ-ACK and the periodic CSI depending on the HARQ-ACK state based on the following conditions. Hereinafter, the case will be introduced that the periodic CSI is transmitted but the HARQ-ACK is dropped.

The cases of the HARQ-ACK being dropped depending on the HARQ-ACK state are limited as follows. In the embodiment of the present invention, herein, a unit for determining the HARQ-ACK is referred to as a transmission block, but another unit (for example, subframe) may be used for determining the HARQ-ACK.

(1) In case that the state of HARQ-ACK is NACK or DTX, which corresponds to the transmission block that is transmitted in a cell configured in FDD method (2) In case that the state of HARQ-ACK is NACK or DTX, which corresponds to the transmission block that is transmitted in a cell configured in TDD method That is, in case that all the states of HARQ-ACK which correspond to the transmission block transmitted in a configured cell are NACK or DTX, the UE may drop the HARQ-ACK and transmit the periodic CSI.

In the following example for more details, the HARQ-ACK may be dropped depending on the HARQ-ACK state.

(1)-1. In FDD method, the HARQ-ACK state corresponding to a transmission block that is transmitted by P-cell is DTX (2)-1. In TDD method, the HARQ-ACK state corresponding to a transmission block that is transmitted by P-cell is DTX (2)-2. When the HARQ-ACK is transmitted through the PUCCH format 3 corresponding to 2 transmission blocks that are transmitted by P-cell in TDD method, in case that the HARQ-ACK state for the transmission block corresponding to DAI=1 of the P-cell is DTX (2)-3. When the HARQ-ACK is transmitted through the PUCCH format 1 by using the channel selection corresponding to 2 transmission blocks that are transmitted by P-cell in TDD method, in case that the HARQ-ACK state for the transmission block corresponding to DAI=1 of the P-cell is DTX (2)-3. When the HARQ-ACK is transmitted through the PUCCH format 1 by using the channel selection or through the PUCCH format 3 corresponding to 3 or 4 transmission blocks that are transmitted by P-cell in TDD method, in case that the HARQ-ACK state for the transmission block corresponding to DAI=1 of the P-cell is DTX (2)-4. When the HARQ-ACK is transmitted through the PUCCH format 3 corresponding to over 4 transmission blocks that are transmitted by P-cell in TDD method, in case that the HARQ-ACK state for the transmission block corresponding to DAI=1 of the P-cell is DTX In case that the states of HARQ-ACK for the transmission blocks transmitted in P-cell are as described above, the HARQ-ACK may be dropped according to the embodiment of the present invention. In the example above, the state of HARQ-ACK for the transmission block for S-cell which is another serving cell may be NACK. For example, in case that the state of HARQ-ACK for the transmission block transmitted in the P-cell is DTX and the state of HARQ-ACK for the transmission block transmitted in the S-cell is NACK, a UE may drop the HARQ-ACK and transmit a specific UCI when the specific UCI and the HARQ-ACK collide. In more detail, for example, it may be assumed that the state of HARQ-ACK for the transmission block transmitted in the P-cell is DTX, the state of HARQ-ACK for the transmission block transmitted in a first S-cell is NACK, and the state of HARQ-ACK for the transmission block transmitted in a second S-cell is NACK. In this case, the UE may drop the HARQ-ACK and transmit a specific UCI when the specific UCI and the HARQ-ACK collide. As another example, even in case of DTX (DAI=1), NACK (DAI=2), DTX (DAI=3), and NACK (DAI=4), the UE may drop the HARQ-ACK and transmit a specific UCI when the specific UCI and the HARQ-ACK collide. In more detail, in case that the state of transmission block transmitted in the P-cell is DTX and the state of transmission block transmitted in the S-cell is DTX or NACK, the UE may drop the HARQ-ACK and transmit a specific UCI when the specific UCI and the HARQ-ACK collide. However, as an exception, in two cases below, the method for determining whether to drop the HARQ-ACK may not be used.

Exception 1) In FDD method, the case that the state of HARQ-ACK of the uplink subframe that is transmitted by a UE corresponding to the transmission block transmitted by one S-cell is NACK and the rest of HARQ-ACK state is DTX Exception 2) In TDD method, the case that one of the HARQ-ACK state that is transmitted by a UE corresponding to the transmission block of DAI>1 of P-cell or the HARQ-ACK state for the transmission block transmitted by S cell is NACK and the remainder is DTX In case of Exception 1 and Exception 2 above, the method for determining whether to drop the HARQ-ACK according to the embodiment of the present invention may not be used, and a UE may drop the periodic CSI and transmit the HARQ-ACK without considering the HARQ-ACK state. In such exceptional situations, a BS may retransmit to the UE by controlling resource allocation (RA) of the PDSCH, modulation and coding scheme (MSC), etc. Whether to use the priority setting depending on the HARQ-ACK state according to the embodiment of the present invention may be configured in a higher layer or predetermined if a specific condition is satisfied.

According to an embodiment of the present invention, in case that the conditions below are satisfied, whether to use the priority setting depending on the HARQ-ACK state according to the embodiment of the present invention may be predetermined.

1) In case that the transmission power for uplink data to be transmitted by a UE is limited, and 2) A subframe where occurs a collision between the HARQ-ACK and the periodic CSI reporting having higher priority than the HARQ-ACK, If above conditions are satisfied, the UE may be configured to perform the method for determining whether to drop the HARQ-ACK depending on the HARQ-ACK state between the HARQ-ACK and periodic CSI reporting. As examples of the method for determining whether to drop the HARQ-ACK depending on the HARQ-ACK state, methods 1, 2 and 3 for determining whether to drop the HARQ-ACK depending on the HARQ-ACK state below may be used.

1) Method 1 for determining whether to drop the HARQ-ACK depending on the HARQ-ACK state In method 1 for determining whether to drop the HARQ-ACK depending on the HARQ-ACK state, a UE may transmit only periodic CSI, not transmitting the HARQ-ACK but dropping it. In case of using method 1 for determining whether to drop the HARQ-ACK depending on the HARQ-ACK state, a BS may detect a value (state) of HARQ-ACK to be DTX even in case that the BS is unable to receive the HARQ-ACK.

2) Method 2 for determining whether to drop the HARQ-ACK depending on the HARQ-ACK state In method 2 for determining whether to drop the HARQ-ACK depending on the HARQ-ACK state, the determination of whether to drop the HARQ-ACK may be performed only in a part of CSI reporting type. For example, it may be configured to drop the HARQ-ACK by limiting it to the CSI reporting type for transmitting RI. That is, only in case of colliding with the CSI reporting information that is transmitting RI, whether to drop the HARQ-ACK may be determined based on the state information of the HARQ-ACK. The CSI reporting type transmitting RI may include, for example, a CSI reporting type for transmitting RI to the CSI, a CSI reporting type for transmitting RI and wideband PMI to the CSI, and a CSI reporting type for transmitting RI and PTI to the CSI. As described above, such CSI reporting types may correspond to CSI reporting types 3, 5 or 6 based on the existing Rel-10.

3) Method 3 for determining whether to drop the HARQ-ACK depending on the HARQ-ACK state In method 3 for determining whether to drop the HARQ-ACK depending on the HARQ-ACK state, as the same as method 2 for determining whether to drop the HARQ-ACK depending on the HARQ-ACK state, it may be configured that a UE may determine whether to drop depending on the HARQ-ACK state only for a part of CSI reporting type. For example, it may be configured to determine whether to drop the HARQ-ACK for the CSI reporting type having a configuration that its period is relatively long. The CSI reporting type having a configuration that its period is relatively long may be a reporting type of which period for performing CSI reporting is $mN_{pd}$. Parameter m may be predetermined value which is greater than 1 or a value greater than 1 configured by higher layer. An index of the CSI reporting type using method 3 for determining whether to drop the HARQ-ACK depending on the HARQ-ACK state may be changed depending on PUCCH reporting modes.

In a subframe in which the HARQ-ACK and the periodic CSI reporting do not collide, whether to transmit the PUCCH that corresponds to the HARQ-ACK may be configured by higher layer.

2. A Method for determining whether to drop the HARQ-ACK depending on the HARQ-ACK state in case that the HARQ-ACK and the SRS collide As described above, in the existing LTE system; the SRS may be distinguished into periodic SRS and aperiodic SRS according to the presence of grant basis. In the transmission priority between the periodic SRS and aperiodic SRS, the aperiodic SRS may have higher priority than a priority of the periodic SRS. In case that the PUCCH is not configured as a shortened PUCCH format and the aperiodic SRS and periodic SRS are transmitted at the same time, a UE drops the periodic SRS and does not transmit it. The shortened PUCCH format is a PUCCH format of which last symbol in a second slot of subframe is empty. The aperiodic SRS may be transmitted without being dropped only in case that a sort of UCI that collides with the aperiodic SRS is periodic CSI.

In the existing LTE system, in case that a resource in which the HARQ-ACK is transmitted and the SRS collide in the PUCCH, a UE drops the SRS without distinguishing whether the SRS is transmitted in periodic or aperiodic manner, and transmits the HARQ-ACK. However, according to an embodiment of the present invention, similar to the case that the periodic CSI reporting and the HARQ-ACK collide described above, whether to drop the HARQ-ACK may be determined depending on the state of HARQ-ACK.

Figure 12:
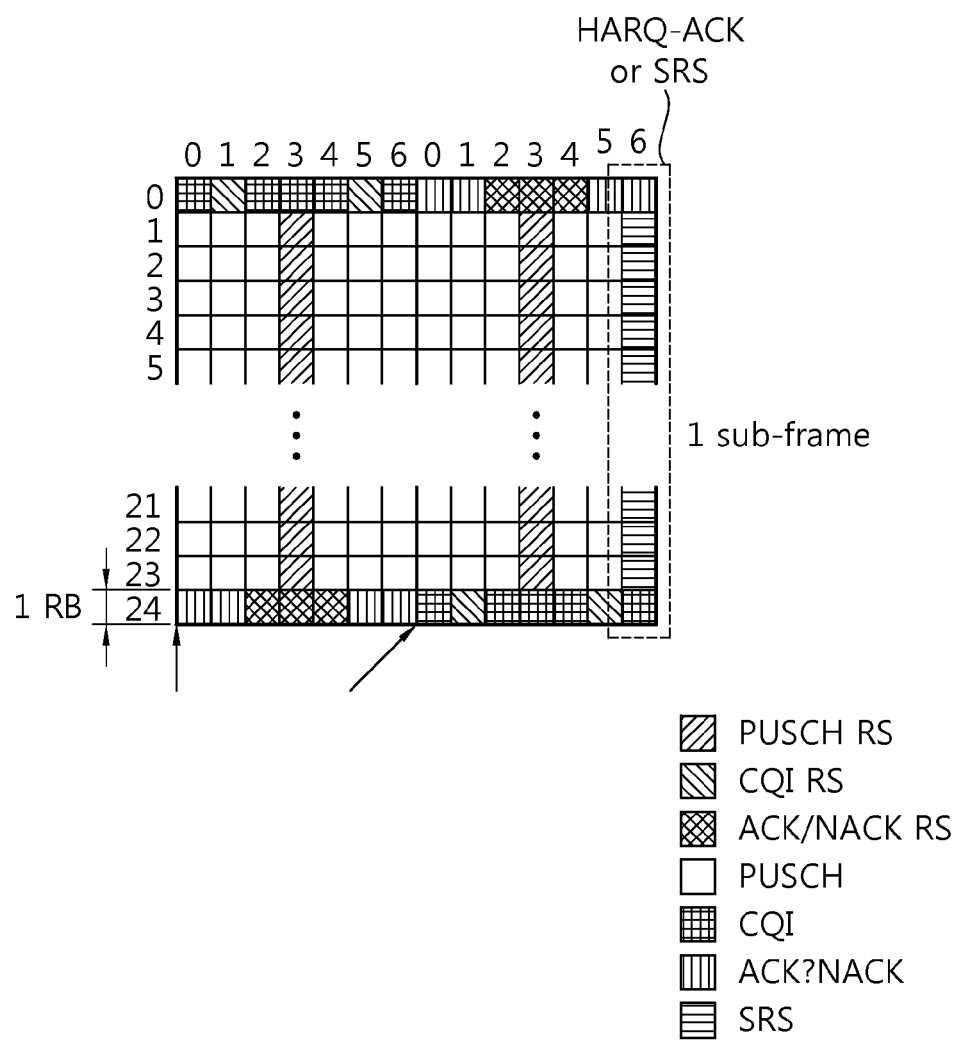
FIG. 12 is a conceptual diagram showing a method for determining whether to drop the HARQ-ACK depending on the HARQ-ACK state according to an embodiment of the present invention.

FIG. 12 is a conceptual diagram showing a method for determining whether to drop the HARQ-ACK depending on the HARQ-ACK state according to an embodiment of the present invention.

Referring to FIG. 12, there may occur a case that the resource in which the HARQ-ACK is transmitted and the resource in which the SRS is transmitted collide. In such a case, in the existing LTE system, the SRS is dropped and the HARQ-ACK is transmitted without considering the state information of HARQ-ACK which is to be transmitted. However, in an embodiment of the present invention, the HARQ-ACK may be dropped and the SRS may be transmitted instead, according to the HARQ-ACK state based on the conditions below. Hereinafter, a case that a UE drops the HARQ-ACK and transmits the SRS will be introduced.

In order to determine whether to drop the HARQ-ACK and transmit the SRS depending on the HARQ-ACK state, the same determination may be performed as the case that the HARQ-ACK and the periodic CSI reporting collide.

That is, in the cases below, the HARQ-ACK may be dropped depending on the HARQ-ACK state.

(1) The case that the state of HARQ-ACK corresponding to the transmission block transmitted in a cell configured in FDD method is NACK or DTX (2) The case that the state of HARQ-ACK corresponding to the transmission block transmitted in a cell configured in TDD method is NACK or DTX That is, in case that all of the states of HARQ-ACK that corresponds to the transmission block transmitted in a configured cell are NACK or DTX, a UE may drop the HARQ-ACK and transmit the periodic CSI.

For more detailed example, in cases described below, the UE may drop the HARQ-ACK depending on the HARQ-ACK state.

(1)-1. In FDD method, the HARQ-ACK state corresponding to a transmission block that is transmitted by P-cell is DTX (2)-1. In TDD method, the HARQ-ACK state corresponding to a transmission block that is transmitted by P-cell is DTX (2)-2. When the HARQ-ACK is transmitted through the PUCCH format 3 corresponding to 2 transmission blocks that are transmitted by P-cell in TDD method, in case that the HARQ-ACK state for the transmission block corresponding to DAI=1 of the P-cell is DTX (2)-3. When the HARQ-ACK is transmitted through the PUCCH format 1 by using the channel selection corresponding to 2 transmission blocks that are transmitted by P-cell in TDD method, in case that the HARQ-ACK state for the transmission block corresponding to DAI=1 of the P-cell is DTX (2)-3. When the HARQ-ACK is transmitted through the PUCCH format 1 by using the channel selection or through the PUCCH format 3 corresponding to 3 or 4 transmission blocks that are transmitted by P-cell in TDD method, in case that the HARQ-ACK state for the transmission block corresponding to DAI=1 of the P-cell is DTX (2)-4. When the HARQ-ACK is transmitted through the PUCCH format 3 corresponding to over 4 transmission blocks that are transmitted by P-cell in TDD method, in case that the HARQ-ACK state for the transmission block corresponding to DAI=1 of the P-cell is DTX In case that the states of HARQ-ACK for the transmission blocks transmitted in P-cell are as described above, the HARQ-ACK may be dropped according to the embodiment of the present invention. In the example above, the state of HARQ-ACK for the transmission block for S-cell which is another serving cell may be NACK. For example, it may be assumed that the state of HARQ-ACK for the transmission block transmitted in the P-cell is DTX, the state of HARQ-ACK for the transmission block transmitted in a first S-cell is NACK, and the state of HARQ-ACK for the transmission block transmitted in a second S-cell is NACK. In this case, the UE may drop the HARQ-ACK and transmit a specific UCI when the specific UCI and the HARQ-ACK collide. As another example, even in case of DTX (DAI=1), NACK (DAI=2), DTX (DAI=3), and NACK (DAI=4), the UE may drop the HARQ-ACK and transmit a specific UCI when the specific UCI and the HARQ-ACK collide. In more detail, in case that the state of transmission block transmitted in, the P-cell is DTX and the state of transmission block transmitted in the S-cell is DTX or NACK, the UE may drop the HARQ-ACK and transmit a specific UCI when the specific UCI and the HARQ-ACK collide. However, as an exception, in two cases below, the method for determining whether to drop the HARQ-ACK may not be used.

Exception 1) In FDD method, the case that the state of HARQ-ACK of the uplink subframe that is transmitted by a UE corresponding to the transmission block transmitted by one S-cell is NACK and the rest of HARQ-ACK state is DTX Exception 2) In TDD method, the case that one of the HARQ-ACK state that is transmitted by a UE corresponding to the transmission block of DAI>1 of P-cell or the HARQ-ACK state for the transmission block transmitted by S cell is NACK and the remainder is DTX In case of Exception 1 and Exception 2 above, the method for determining whether to drop the HARQ-ACK according to the embodiment of the present invention may not be used, and a UE may drop the SRS and transmit the HARQ-ACK without considering the HARQ-ACK state. In such exceptional situations, a BS may retransmit to the UE by controlling resource allocation (RA) of the PDSCH, modulation and coding scheme (MSC), etc. which are corresponding to NACK. Whether to use the priority setting depending on the HARQ-ACK state according to the embodiment of the present invention may be configured in a higher layer or predetermined if a specific condition is satisfied.

According to an embodiment of the present invention, in case that the conditions below are satisfied, whether to use the priority setting depending on the HARQ-ACK state may be predetermined.

1) In case that the transmission power for uplink data to be transmitted by a UE is limited, and 2) A subframe in which the HARQ-ACK and the SRS collide If above conditions are satisfied, the UE may be configured to perform the method for determining whether to drop the HARQ-ACK depending on the HARQ-ACK state between the HARQ-ACK and periodic CSI reporting. As examples of the method for determining whether to drop the HARQ-ACK depending on the HARQ-ACK state, methods 1, 2 and 3 may be used.

1) Method 1 for determining whether to drop the HARQ-ACK depending on the HARQ-ACK state In method 1 for determining whether to drop the HARQ-ACK depending on the HARQ-ACK state, if the HARQ-ACK collides with the SRS, the HARQ-ACK may be dropped and the SRS may be transmitted regardless of the SRS being periodic or aperiodic.

2) Method 2 for reconfiguring the transmission priority

In method 2 for determining whether to drop the HARQ-ACK depending on the HARQ-ACK state, the HARQ-ACK may be dropped only in case that the HARQ-ACK collides with the SRS. That is, in a subframe in which the HARQ-ACK and the SRS collide, the HARQ-ACK is dropped and the aperiodic SRS is transmitted. In case that the periodic SRS and the HARQ-ACK collide, the HARQ-ACK may not be dropped and transmitted.

In a subframe in which the HARQ-ACK and the SRS having higher transmission priority than the HARQ-ACK do not collide, whether to transmit the PUCCH that corresponds to the HARQ-ACK may be configured by a higher layer.

Figure 13:
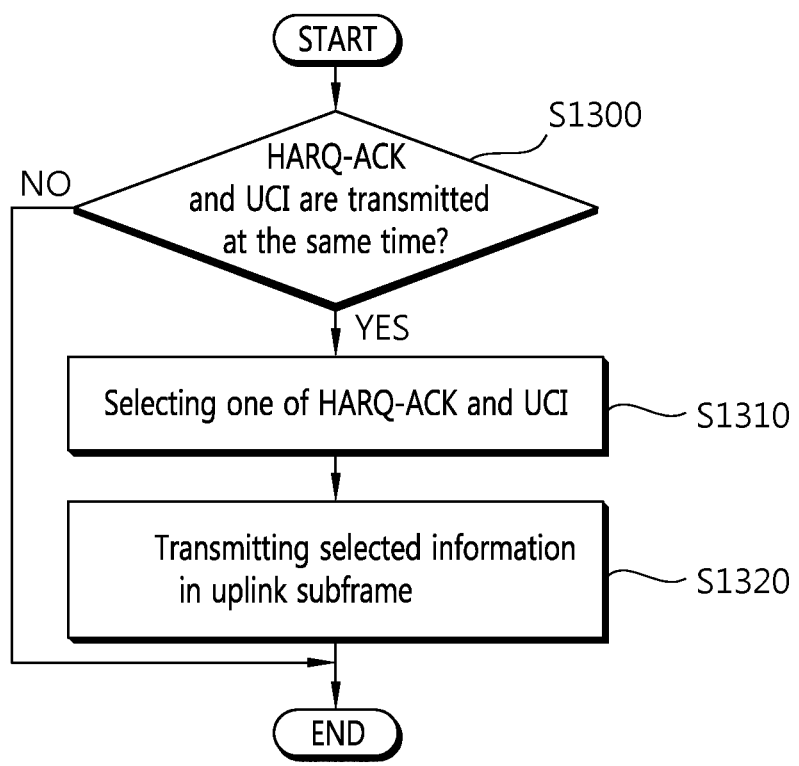
FIG. 13 is a flowchart showing a method for determining whether to drop the HARQ-ACK depending on the HARQ-ACK state according to an embodiment of the present invention.

FIG. 13 is a flowchart showing a method for determining whether to drop the HARQ-ACK depending on the HARQ-ACK state according to an embodiment of the present invention.

Referring to FIG. 13, it is determined whether the HARQ-ACK and the UCI are transmitted at the same time in an uplink subframe (step, S1300).

In case that the HARQ-ACK state for the transmission block is DTX or NACK in a UCI transmitting method depending on the HARQ-ACK state, the HARQ-ACK may be dropped while the UCI may be transmitted. As described above, the UCI may be the information of the periodic CSI reporting information or the SRS. The periodic CSI reporting includes the information related to the downlink channel state. The periodic CSI reporting may be the information that is transmitted through the uplink control channel according to the period configured based on a higher layer signaling. The SRS may be a reference signal that is transmitted in a specific subframe based on the configured transmission period and the transmission offset information.

If a simultaneous transmission is occurred, one of the above HARQ-ACK and the UCI is selected depending on the HARQ-ACK state for the HARQ-ACK (step, S1310).

In case that the HARQ-ACK and the UCI are transmitted at the same time, a UE, as described above, may determine whether to transmit the UCI or to transmit the HARQ-ACK depending on the HARQ-ACK state. Transmission may be abandoned for what is not selected among the HARQ-ACK and the UCI. The HARQ-ACK may be an information unit including multiple HARQ-ACKs for multiple transmission blocks that is received from a serving cell. For example, if the HARQ-ACK state for the multiple HARQ-ACK is DTX, the UCI is selected to transmit but the transmission of HARQ-ACK may be abandoned. For another example, if the HARQ-ACK state for the transmission unit corresponding to DAI=1 among the multiple HARQ-ACKs is DTX, the UCI is selected to transmit. For still another example, the HARQ-ACK may include multiple HARQ-ACKs for the multiple transmission blocks that are received from multiple serving cells. In this case, if the HARQ-ACK state for the subframe corresponding DAI=1 that is transmitted from a serving cell among the multiple serving cells above is DTX, the UCI may be selected.

In case that a simultaneous transmission of the HARQ-ACK and the UCI does not occur, the data mapped to the corresponding resource may be transmitted.

What is selected from the HARQ-ACK and the UCI is transmitted in the uplink subframe (step, S1320).

According to S1310, either the HARQ-ACK or the UCI may be transmitted and the one that is not transmitted may be dropped.

3. Method for controlling uplink power depending on the HARQ-ACK state

In the existing LTE system, in case that the PUSCH and the PUCCH are transmitted at the same time, in order to control the power for the PUCCH and the PUSCH, the priority of power allocation for the PUCCH is configured to be highest, and the next priority of power allocation is for the PUSCH including the UCI. In this case, an upper limit of the power control may be determined by the power of resource to which corresponds to higher priority of the transmission allocation is set rather than that of the corresponding resource based on the power allocation priority. For example, transmission power of the PUSCH not including the UCI is configured such that a value of subtracting a power of the PUCCH and a power of the PUSCH that includes the UCI from the maximum transmission power of a UE is the upper limit.

According to an embodiment of the present invention, a priority of uplink power control may be differently configured depending on the HARQ-ACK state.

For example, in case that two conditions below are satisfied, the power allocation priority among the resources may be differently configured when controlling the uplink power depending on the HARQ-ACK state.

1) In case that the HARQ-ACK state is NACK or DTX, and

2) In case that a simultaneous transmission of the PUCCH and the PUSCH are configured in a UE and the PUCCH and the PUSCH are transmitted in the same subframe The above conditions are exemplary conditions to determine priority of power allocation. That is, in order to determine the priority of power allocation, it may be determined under different conditions.

Hereinafter, in an embodiment of the present invention, for the convenience of description, it will be described in the limited case that the UCI transmitted through the PUCCH is the HARQ-ACK. For example, in an embodiment of the present invention, uplink power configuration as below may be performed.

1) Method 1 for configuring uplink power

An upper limit of transmission power that corresponds to the PUCCH corresponding to the HARQ-ACK may be configured based on a transmission power of the PUSCH transmitted to all cells regardless of the presence of PUSCH transmitting the UCI. A transmission power of the PUSCH may be a value in which scaling is performed based on a difference between a linear value of UE total configured maximum power and a linear value of the PUSCH power that transmits the UCI.

2) Method 2 for configuring uplink power

In case that there is the PUSCH that transmits the UCI, the PUCCH that transmits the HARQ-ACK may be configured to have a lower priority than that of the PUSCH that transmits the UCI in power allocation. An upper limit of the power that corresponds to the PUCCH may be determined based on UE total configured maximum power and a power of the PUSCH including the UCI.

Equation 1 below represents a method of reconfiguring a linear value of the transmission power that corresponds to the PUCCH.

$$\hat{P}_{PUCCH}(i) = \min(\hat{P}_{PUCCH}(i), (\hat{P}PCMAX(i) - \hat{P}_{PUSCH,j}(i))) \quad \text{<Equation 1>}$$

In Equation 1, i is a subframe index, $\hat{P}_{PUCCH}(i)$ a linear value of the PUCCH transmission power in subframe i, $\hat{P}_{CMAX}(i)$ is a linear value of the UE total configured maximum power in subframe i, and $\hat{P}_{PUSCH,j}(i)$ near value of the PUSCH transmission power transmitting the UCI in subframe i.

That is, 1) the linear value of PUCCH transmission power in subframe i, 2) a smaller value between the linear value of the UE total configured maximum power in subframe i and the linear value of PUSCH transmission power that includes the UCI are determined to be the upper limit of PUCCH transmission power.

3) Method 3 for configuring uplink power

In case that there is the PUSCH that transmits the RI, the PUCCH that transmits the HARQ-ACK may be configured to have a lower priority than that of the PUSCH that transmits the RI in power allocation. An upper limit of the power that corresponds to the PUCCH may be determined based on a UE total configured maximum power and a power of the PUSCH including the RI. As an example of the method for reconfiguring the linear value of PUCCH transmission power, the linear value of PUCCH transmission power may be reconfigured by assuming that $\hat{P}_{PUSH,j}(i)$ in Equation 1 is the linear value of PUSCH transmission power transmitting the RI. That is, the PUCCH transmission power may be determined based on Equation 2 below.

$$\hat{P}_{PUCCH}(i) = \min(\hat{P}_{PUCCH}(i), (\hat{P}_{CMAX}(i) - \hat{P}_{PUSCH,j}(i))) \quad \text{<Equation 2>}$$

In Equation 2, i is a subframe index, $\hat{P}_{PUCCH}(i)$ is a linear value of the PUCCH transmission power in subframe i, $\hat{P}_{CMAX}(i)$ is a linear value of the UE total configured maximum power in subframe i, and $\hat{P}_{PUSCH,j}(i)$ is a linear value of the PUSCH transmission power transmitting the RI in subframe i.

4) Method 4 for configuring uplink power

In case that a UE firstly accesses to a BS or there is no radio resource for transmitting signal, the UE may perform a random access process for the BS. For this, the UE may acquire a physical random access channel (PRACH) parameter, and transmit a specific sequence as a preamble through the PRACH of uplink channel. When the BS receives the RACH preamble, the BS may transmit a RACH response through the PDCCH/PDSCH on the downlink channel. After receiving the PACH preamble, the UE transmits RACH message 3 (MSG3). RACH MSG3 may include UE capacity information, by using the information, a negotiation for the UE capacity between the BS and the UE is available through a UE-specific or UE group-specific RRC signaling after the RACH process. The BS may allocate carrier aggregation information with the UE-specific or the UE group-specific method based on the negotiation information of the UE capacity.

In case that the UE performs the random access process based on the PUSCH, a power may be allocated as higher priority than that of the PUCCH that transmits the HARQ-ACK. The PUSCH used for the random access process may be limited to the PUSCH that corresponds to RACH MSG3. In this case, an upper limit of the PUCCH power may be configured based on the UE total configured maximum power and the power value of PUSCH that corresponds to the RACH MSG3.

As an example of the method for reconfiguring the linear value of PUCCH transmission power, there may be a method of reconfiguring $\hat{P}_{PUSCH,j}(i)$ in Equation 1 of method 4 for configuring uplink power to be the linear value of PUSCH transmission power that corresponds to RACH MSG3. That is, the PUSCH transmission power may be determined based on Equation 3 below.

$$\hat{P}_{PUCCH}(i) = \min(\hat{P}_{PUCCH}(i), (\hat{P}_{CMAX}(i) - (\hat{P}_{PUSCH,j}(i)))) \quad \text{<Equation 3>}$$

In Equation, 3, i is a subframe index, $\hat{P}_{PUCCH}(i)$ is a linear value of the PUCCH transmission power in subframe i, $\hat{P}_{CMAX}(i)$ is a linear value of the UE total configured maximum power in subframe i, and $\hat{P}PUSCH,j^{(i)}$ is a linear value of the PUSCH transmission power that corresponds to RACH MSG3 in subframe i.

The above described methods 1 to 4 for configuring uplink power may be configured by a higher layer. For example, for the UE in which the transmission power is limited, whether to configure the transmission power for PUSCH to be 0 in the higher layer.

Figure 14:
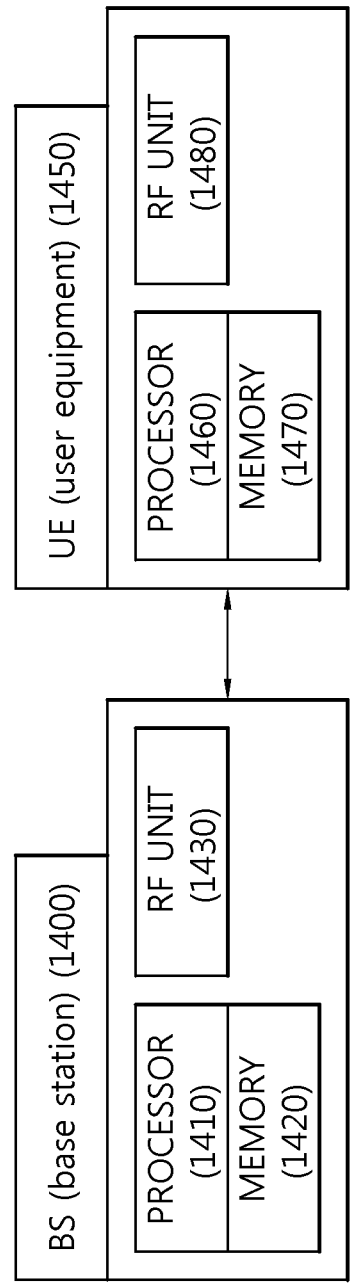
FIG. 14 is a block diagram showing a wireless communication system according to an embodiment of the present invention.

FIG. 14 is a block diagram showing a wireless communication system according to an embodiment of the present invention.

Referring to FIG. 14, a BS 1400 includes a processor 1410, a memory 1420 and a RF unit 1430. The memory 1420 is connected to the processor 1410 and configured to store various information used for the operations for the processor 1410. The RF unit 1430 is connected to the processor 1410 and configured to transmit and/or receive a radio signal. The processor 1410 implements the proposed functions, processed, and/or methods. In the described embodiments, the operation of BS may be implemented by the processor 1410.

For example, the processor 1410 may determine a size of frequency band to which the CRS is transmitted by considering a size of overall system bandwidth.

A wireless apparatus 1450 includes a processor 1460, a memory 1470, and a radio frequency (RF) unit 1480. The memory 1470 is connected to the processor 1460 and configured to store various information used for operating the processor 1460. The RF unit 1480 is connected to the processor 1460 and configured to transmit and/or receive a radio signal. The processor 1460 implements the proposed functions, processed, and/or methods. In the embodiments described above, the operation of the wireless apparatus may be implemented by the processor 1460.

For example, the processor 1460 may determine a size of frequency band to which the CRS is transmitted by considering a size of overall system bandwidth.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in uplink subframe, the method comprising:
    determining whether hybrid automatic retransmission request-acknowledgement (HARQ-ACK) and uplink control information (UCI) are simultaneously transmitted in the uplink subframe;
    selecting one of the HARQ-ACK and the UCI depending on the state of the HARQ-ACK, if the simultaneous transmission occurs; and
    transmitting the selected one of the HARQ-ACK and the UCI in the uplink subframe,
    wherein the UCI includes at least one of periodic reporting channel state information (CSI) and sounding reference signal (SRS),
    wherein the state of the HARQ-ACK is one of ACK, non-acknowledgement (NACK), and discontinuous transmission (DTX), and
    wherein the UCI is selected and transmitted in the uplink subframe if the state of the HARQ-ACK is the DTX or the NACK.

2. The method of claim 1,
    wherein one of the HARQ-ACK and the UCI which is not the selected one of the HARQ-ACK and the UCI is dropped.

3. The method of claim 1,
    wherein the periodic reporting CSI includes information on a downlink channel state, the periodic reporting CSI transmitting via uplink control channel according to a period configured based on a higher layer signaling, and
    wherein the SRS is transmitted in a subframe specified based on a configured transmission period and a configured transmission offset information.

4. The method of claim 1,
    wherein the HARQ-ACK includes a plurality of HARQ-ACK signals for a plurality of transmission blocks received from a serving cell.

5. The method of claim 4, wherein the UCI is selected if each of states of the plurality of HARQ-ACK signals is the DTX.

6. The method of claim 4, wherein the UCI is selected if a state of at least one of the HARQ-ACK signals for a transmission block corresponding to downlink assignment index (DAI)=1 among the plurality of HARQ-ACK signals is the DTX.

7. The method of claim 1,
    wherein the HARQ-ACK includes a plurality of HARQ-ACK signals for a plurality of transmission blocks received from a plurality of serving cells, and
    wherein the UCI is selected if a state of HARQ-ACK signals for a transmission block corresponding to downlink assignment index (DAI)=1 transmitted from a serving cell among the plurality of serving cells is the DTX.

8. The method of claim 7,
    wherein the serving cell is a primary (P)-cell, at least one remaining cell of the plurality of serving cells is a secondary (S)-cell,
    wherein the P-cell and the S-cell are carrier aggregated cells, and
    wherein the S-cell is activated by the P-cell.

9. A user equipment transmitting data in a wireless communication system, the user equipment comprising: a radio frequency (RF) unit; and a processor,
    wherein the processor is configured to:
    determine whether hybrid automatic retransmission request-acknowledgement (HARQ-ACK) and uplink control information (UCI) are simultaneously transmitted in an uplink subframe,
    select one of the HARQ-ACK and the UCI depending on the state of the HARQ-ACK if the simultaneous transmission occurs, and
    transmit the selected one of the HARQ-ACK and the UCI in the uplink subframe,
    wherein the UCI includes at least one of periodic reporting channel state information (CSI) and sounding reference signal (SRS),
    wherein the state of the HARQ-ACK is one of ACK, non-acknowledgement (NACK), and discontinuous transmission (DTX), and
    wherein the UCI is selected and transmitted in the uplink subframe if the state of the HARQ-ACK is the DTX or the NACK.

10. The user equipment of claim 9, wherein one of the HARQ-ACK and the UCI which is not selected one of the HARQ-ACK and the UCI is dropped.

11. The user equipment of claim 9,
    wherein the periodic reporting CSI includes information on a downlink channel state, the periodic reporting CSI transmitting via uplink control channel according to a period configured based on a higher layer signaling, and wherein the SRS is transmitted in a subframe specified based on a configured transmission period and a configured transmission offset information.

12. The user equipment of claim 9,
wherein the HARQ-ACK includes a plurality of HARQ-ACK signals for a plurality of transmission blocks received from a serving cell.

13. The user equipment of claim 12,
wherein the UCI is selected if each of states of the plurality of HARQ-ACK signals is the DTX.

14. The user equipment of claim 12,
wherein the UCI is selected if a state of at least one of the HARQ-ACK signals for a transmission block corresponding to downlink assignment index (DAI)=1 among the plurality of HARQ-ACKs is the DTX.

15. The user equipment of claim 9,
wherein the HARQ-ACK includes a plurality of HARQ-ACK signals for a plurality of transmission blocks received from a plurality of serving cells, and
wherein the UCI is selected if a state of HARQ-ACK signals for a transmission block corresponding to downlink assignment index (DAI)=1 transmitted from a serving cell among the plurality of serving cells is the DTX.

16. The user equipment of claim 15,
wherein the serving cell is a primary (P)-cell, at least one remaining cell of the plurality of serving cells is a secondary (S)-cell,
wherein the P-cell and the S-cell are carrier aggregated, and
wherein the S-cell is activated by the P-cell.

* * * * *